(12) United States Patent
Larson et al.

(10) Patent No.: US 7,657,052 B2
(45) Date of Patent: Feb. 2, 2010

(54) MICROPHONE SYSTEM FOR VEHICLE

(75) Inventors: Mark L Larson, Grand Haven, MI (US); Andrew D Weller, Holland, MI (US); Joshua L Barr, Bangor, MI (US); Eric P Bigoness, Kentwood, MI (US); Timothy R Lambrix, Grand Haven, MI (US); Carol L DeBoer, Zeeland, MI (US); Joseph P McCaw, Lawrence, MI (US)

(73) Assignee: Donnelly Corporation, Holland, MI (US)

( * ) Notice: Subject to any disclaimer, the term of this patent is extended or adjusted under 35 U.S.C. 154(b) by 967 days.

(21) Appl. No.: 10/529,715

(22) PCT Filed: Oct. 2, 2003

(86) PCT No.: PCT/US03/30877

§ 371 (c)(1),
(2), (4) Date: Mar. 30, 2005

(87) PCT Pub. No.: WO2004/032568

PCT Pub. Date: Apr. 15, 2004

(65) Prior Publication Data

US 2006/0109996 A1    May 25, 2006

Related U.S. Application Data

(60) Provisional application No. 60/415,233, filed on Oct. 1, 2002, provisional application No. 60/429,360, filed on Nov. 26, 2002.

(51) Int. Cl.
H04R 25/00    (2006.01)

(52) U.S. Cl. .................. 381/365; 381/361; 381/355

(58) Field of Classification Search .................. 381/86, 381/355, 356, 357, 361, 365, 389; 359/604, 359/609, 872; 340/425.5, 438, 525
See application file for complete search history.

(56) References Cited

U.S. PATENT DOCUMENTS

| 4,930,742 A | 6/1990 | Schofield et al. |
|---|---|---|
| 4,959,865 A | 9/1990 | Stettiner et al. |

(Continued)

FOREIGN PATENT DOCUMENTS

WO    WO 98/17046    4/1998

(Continued)

*Primary Examiner*—Huyen D Le
(74) *Attorney, Agent, or Firm*—Van Dyke, Gardner, Linn & Burkhart LLP

(57) ABSTRACT

A vehicle interior rearview mirror assembly (10) comprises an accessory (24), a reflective element (18) and a bezel (20). The mirror assembly may define portions of a pocket (23) that at least partially receives and secures the accessory therebetween when the reflective element is at least partially received in the bezel. The mirror assembly (11) may include a microphone (124) and an acoustic cover (126) positioned at least partially over one or more inlet ports (124*j*, 124*k*) of the microphone. The acoustic cover may include an outer air flow limiting layer (130*b*) that substantially limit air flow therethrough and a diffusing material (130*a*) that may space and support the outer layer from the inlet ports to substantially diffuse air flow that penetrates the outer layer. An acoustic barrier (132) may be positioned between a pair of inlet port of the microphone to enhance the directivity of the microphone.

21 Claims, 21 Drawing Sheets

U.S. PATENT DOCUMENTS

| | | |
|---|---|---|
| 5,671,996 A | 9/1997 | Bos et al. |
| 5,703,957 A | 12/1997 | McAteer |
| 5,820,245 A | 10/1998 | Desmond et al. |
| 5,828,012 A | 10/1998 | Repollé et al. |
| 6,243,003 B1 | 6/2001 | DeLine et al. |
| 6,278,377 B1 | 8/2001 | DeLine et al. |
| 6,326,613 B1 | 12/2001 | Heslin et al. |
| 6,329,925 B1 | 12/2001 | Skiver et al. |
| 6,366,213 B2 | 4/2002 | DeLine et al. |
| 6,420,975 B1 | 7/2002 | DeLine et al. |
| 6,428,172 B1 | 8/2002 | Hutzel et al. |
| 6,433,676 B2 | 8/2002 | DeLine et al. |
| 6,614,911 B1 | 9/2003 | Watson et al. |
| 6,648,477 B2 * | 11/2003 | Hutzel et al. ............... 359/604 |
| 6,690,268 B2 | 2/2004 | Schofield et al. |
| 6,717,524 B2 | 4/2004 | DeLine et al. |
| 6,774,356 B2 | 8/2004 | Heslin et al. |
| 6,906,632 B2 | 6/2005 | DeLine et al. |
| 2002/0032510 A1 | 3/2002 | Turnbull et al. |
| 2002/0080021 A1 * | 6/2002 | Skiver et al. ............... 340/438 |
| 2002/0110255 A1 | 8/2002 | Killion et al. |
| 2002/0110256 A1 | 8/2002 | Watson et al. |

FOREIGN PATENT DOCUMENTS

WO    WO 01/37519 A2    5/2001

* cited by examiner

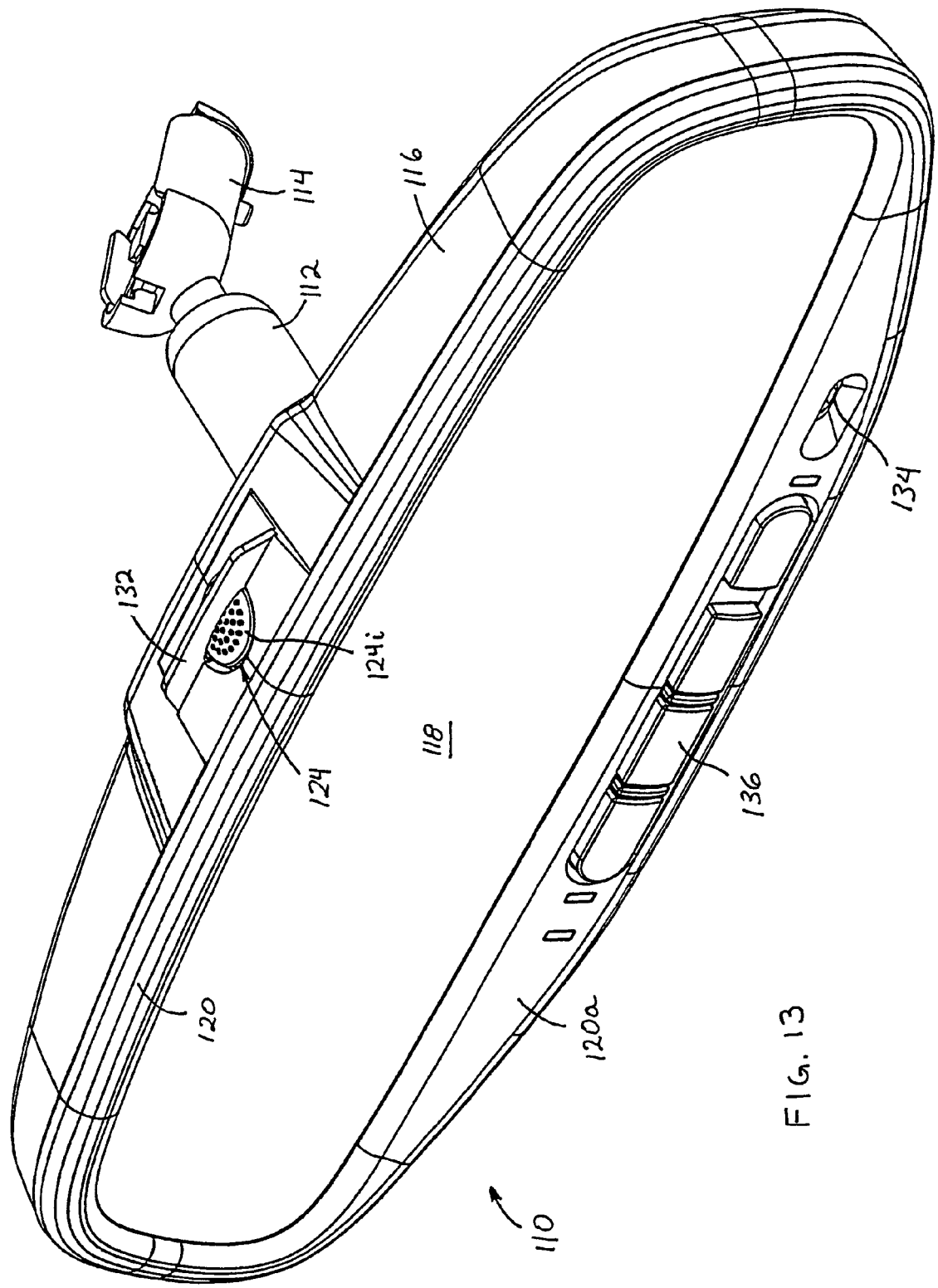

MICROPHONE SYSTEM FOR VEHICLE

CROSS REFERENCE TO RELATED APPLICATIONS

The present application is a 371 national phase application of PCT Application No. PCT/US2003/030877, filed Oct. 1, 2003, which claims priority of U.S. provisional application Ser. No. 60/415,233, filed Oct. 1, 2002 by DeBoer et al. for INTERIOR REARVIEW MIRROR ASSEMBLY WITH ACCESSORY; and Ser. No. 60/429,360, filed Nov. 26, 2002 by Weller for MICROPHONE SYSTEM FOR VEHICLE, which are hereby incorporated herein by reference in their entireties.

FIELD OF THE INVENTION

The present invention relates generally to a microphone or microphones or microphone system in a vehicle and, more particularly, to a microphone or microphones or microphone system in entities that are positioned in, at or adjacent to an interior rearview mirror assembly of the vehicle and/or a windshield electronic module and/or an accessory module.

BACKGROUND OF THE INVENTION

Interior rearview mirror manufacturers typically manufacture and/or purchase various components and assemble the components together to make the mirror assembly. It is often desirable to include accessories, such as a microphone or microphone module or the like, into the mirror assembly. The mirror manufacturers thus may manufacture some components of the mirror assembly, such as the bezel, housing, support or the like, and purchase the accessory or accessories from a supplier. The mirror manufacturers may also purchase or make some of the mirror components, such as an electrochromic reflective element assembly or cell with a printed circuit board mounted on the back of the cell (i.e., an electrochromic mirror kit). The components and accessories are then typically assembled by the mirror manufacturer to complete the mirror assembly in a complete mirror assembly operation. Typically, the electrochromic kit or the like is positioned at least partially in a bezel, which is then attached to the casing of the mirror assembly. However, it is often difficult to assemble the accessory to the mirror assembly.

It is also known to provide a microphone or microphones in an entity that is positioned in or adjacent to an interior rearview mirror assembly, such as in or at the interior rearview mirror assembly itself or at an accessory module or the like at or around the interior rearview mirror assembly. The microphone or microphones is/are operable to receive sound signals, such as for a telecommunications system or the like. Examples of such microphones and associated sound acquisition systems are disclosed in commonly assigned U.S. Pat. Nos. 6,243,003; 6,278,377; and 6,420,975, which are hereby incorporated herein by reference. The microphone or microphones may be positioned in the interior rearview mirror assembly casing or housing or at or in an accessory module or attachment or the like positioned at or near the interior rearview mirror assembly. Such a location is typically preferred to enhance the effectiveness of the microphone or microphones, since that is typically where a driver may look when speaking.

However, in many vehicles, it is desirable to have a heating, ventilation and air conditioning (HVAC) system which is selectively operable to blow air forcefully onto the inner surface of the windshield to defrost or defog the windshield. Such intense air blowing onto the windshield, and thus generally toward the interior rearview mirror assembly, may lead to undesired deterioration of the signal to noise ratio of the microphone or microphones positioned at or around the interior rearview mirror assembly. Systems have been proposed to provide an improved signal to noise ratio, such as described in commonly assigned U.S. Pat. Nos. 6,243,003; 6,278,377; and 6,420,975, which are hereby incorporated herein by reference. However, it is typically desirable to further enhance the performance of the microphone system to further reduce the effects of the blower noise on the microphone signal, without adversely affecting the position of the microphone.

Therefore, there is a need in the art for a microphone or accessory which is positionable in, at or adjacent to an interior rearview mirror assembly of a vehicle or in or at a windshield electronic module or accessory module of a vehicle, and which overcomes the above disadvantages and shortcomings of the prior art.

SUMMARY OF THE INVENTION

The present invention provides an interior rearview mirror assembly which includes an accessory or microphone pocket for at least partially receiving an accessory or microphone module therein. The pocket is formed by a portion of a plastic printed circuit board mounting or attachment plate and a portion or tab on the bezel of the housing, which typically is adjustable about a pivot member or arm, such as disclosed in commonly assigned U.S. Pat. Nos. 6,329,925; 6,172,613; 6,087,953; 5,820,097; 5,377,949; and/or 5,330,149, which are hereby incorporated herein by reference. The accessory may be positioned at one portion of the mirror assembly, such as in a partial pocket formed on the mounting plate, and then may be secured in place by another portion of the mirror assembly, such as by overlapping or snapping a bezel portion or tab over the accessory to secure the accessory within a pocket. The cooperation between the structure of the plastic plate and the portion of bezel forms a retaining structure or pocket when the two components are combined. The accessory may be provided in the pocket as the two components are combined to substantially secure and contain the accessory within the pocket structure.

The present invention also provides a microphone or microphone assembly or system positioned at or in or partially in an interior rearview mirror assembly of a vehicle or at or in or partially in a windshield electronic module or accessory module of the vehicle. The microphone assembly may include a flow diffusing material or combination of materials which functions to accept and diffuse air flow around the microphone (which may comprise a unidirectional microphone) to minimize the adverse affect of turbulent air flow at or near the microphone, while providing optimal performance and directivity of the microphone.

According to an aspect of the present invention, an interior rearview mirror assembly for a vehicle comprises an accessory, a reflective element and a bezel. The reflective element includes a mounting plate at a rearward surface thereof (by rearward surface, it is meant the surface that is opposite the forward surface of the mirror reflective element, where the forward surface is the surface that is viewed by a driver of the vehicle). The mounting plate includes a first portion of a pocket for at least partially receiving the accessory therein. The bezel at least partially receives the reflective element therein and includes a second portion of the pocket. The first and second portions of the pocket at least partially receive and secure the accessory therebetween when the reflective element is at least partially received in the bezel.

The accessory may be electrically connected to a circuit board mounted to the mounting plate and the bezel may be secured to a rearward casing or housing portion to assemble the reflective element, mounting plate, accessory and printed circuit board at least partially within the mirror assembly. Preferably, the accessory comprises a microphone module.

According to another aspect of the present invention, an interior mirror assembly for a vehicle includes a reflective element having a mounting plate or attachment plate at a rearward surface thereof. The mounting plate includes a platform or partial pocket extending therefrom for at least partially receiving an accessory therein. The mirror assembly includes a bezel portion which at least partially receives the reflective element. The bezel portion includes an accessory tab which extends rearwardly therefrom. The accessory tab extends in an overlapping relationship with the accessory within the partial pocket of the mounting plate as the reflective element is at least partially received in or assembled to the bezel portion, thereby securing the accessory within a pocket defined by and between the partial pocket of the mounting plate and the accessory tab.

According to another aspect of the present invention, an interior rearview mirror assembly for a vehicle includes a reflective element or reflective element assembly having a mounting plate or attachment plate at a rearward surface thereof. The mounting plate includes a platform or partial pocket extending therefrom for at least partially receiving an accessory therein. The mirror assembly includes a bezel portion which at least partially receives the reflective element assembly. The accessory module includes a receiving element, such as a slot or groove or channel or the like, that is configured to receive the bezel edge when the accessory is positioned at the partial pocket and the reflective element assembly is received by the bezel portion. The bezel and the accessory create an overlapping relationship with the accessory within the partial pocket of the mounting plate as the reflective element assembly is at least partially received in or assembled to the bezel portion, thereby securing the accessory within a pocket defined by and between the partial pocket of the mounting plate and the bezel portion. The pocket is completed by the case which extends over a rear edge of the accessory to substantially secure accessory between the bezel and the casing of the mirror assembly.

According to another aspect of the present invention, a method for assembling an interior rearview mirror assembly comprises providing a bezel portion with a first portion of an accessory pocket and providing a reflective element with a mounting plate or attachment plate on a rear surface thereof. The mounting plate includes a second portion of the accessory pocket. An accessory is positioned at one of the first and second portions of the accessory pocket. The reflective element is assembled to the bezel portion, whereby the accessory is at least partially received and retained between the first and second portions as the reflective element is assembled to the bezel portion.

Optionally, the reflective element assembly with the mounting plate can be assembled to the bezel. The accessory or microphone may be installed into the pocket formed by the bezel and mounting plate. The accessory may thus be held in position until the mirror case is installed over the back or rear of the bezel, thereby trapping the accessory or microphone in the pocket and generally between the bezel portion and the mirror case.

According to another aspect of the present invention, an interior rearview mirror system of a vehicle includes an interior rearview mirror assembly, at least one microphone, an acoustic cover and an acoustic barrier. The interior rearview mirror assembly comprises a reflective element and a casing and is adapted for attachment to an interior portion of the vehicle. The at least one microphone is positioned in, at or adjacent to the interior rearview mirror assembly and has first and second inlet ports for receiving audible signals from within the vehicle cabin. The acoustic cover is positioned over the first and second inlet ports of the at least one microphone. The acoustic cover comprises an outer air flow limiting layer or canopy and at least one inner air flow limiting layer or cover. The at least one inner air flow limiting layer is disposed at the first and second inlet ports and the outer air flow limiting layer is spaced from the at least one inner air flow limiting layer and defines a space between the air flow limiting layers. The outer air flow limiting layer and the at least one inner air flow limiting layer are configured to substantially limit air flow therethrough. The acoustic barrier is positioned across the microphone and between the first and second inlet ports. The acoustic barrier may be configured to substantially acoustically isolate the first inlet port from the second inlet port.

The acoustic cover may comprise an outer rigid cover, with the outer air flow limiting layer attached to the outer rigid cover. The acoustic barrier may define a gap between a distal end of the acoustic barrier from the microphone and an inner surface of the outer air flow limiting layer. The space between the inner and outer air flow limiting layers may comprise a diffusing material for diffusing air flow that permeates the outer air flow limiting layer, or may comprise air. The outer air flow limiting layer may comprise a hydrophobic characteristic.

According to yet another aspect of the present invention, an interior rearview mirror system of a vehicle comprises an interior rearview mirror assembly, at least one microphone, and preferably a directional microphone, positioned at the interior rearview mirror assembly, and an acoustic cover. The interior rearview mirror assembly comprises a reflective element and a casing adapted for mounting to an interior portion of the vehicle (such as a windshield portion or a header portion). The directional microphone preferably includes at least one inlet port (and preferably two separated inlet ports) for receiving audible signals from within the vehicle cabin. The acoustic cover is positioned at least partially over the inlet port or ports of the directional microphone and comprises a diffusing material and an air flow limiting material positioned at least partially over the diffusing material. The air flow limiting material is configured to substantially limit air flow through the air flow limiting material, while the diffusing material is configured to space and support the air flow limiting material from the inlet port or ports and to substantially diffuse air flow that penetrates the air flow limiting material.

The directional microphone may have separated inlet ports for receiving signals from within the vehicle cabin. The mirror system may include an acoustic barrier positioned between the inlet ports of the directional microphone to enhance the directivity of the microphone.

The microphone may be positioned at or between the bezel and the rear housing of the interior rearview mirror assembly, which typically is adjustable about a pivot member or arm, such as disclosed in commonly assigned U.S. Pat. Nos. 6,329,925; 6,172,613; 6,087,953; 5,820,097; 5,377,949; and/or 5,330,149, which are hereby incorporated herein by reference. The microphone or other accessory may be electrically connected to a circuit board mounted or positioned at the reflective element and within the mirror assembly or within an attachment or module at or near the mirror assembly.

According to another aspect of the present invention, an interior rearview mirror system of a vehicle comprises an interior rearview mirror assembly and a microphone system. The interior rearview mirror assembly comprises a reflective element and a casing or housing and is adapted to mount to an interior portion of the vehicle (such as a windshield portion or a header portion or a console or the like). The microphone system is positioned at, near or partially within the interior rearview mirror assembly and comprises a directional microphone having separated inlet ports for receiving audible signals from within the vehicle cabin, a diffuser and an acoustic barrier. The diffuser is positioned at least partially over the inlet ports of the directional microphone. The diffuser is configured to substantially diffuse air flow around the inlet ports. The acoustic barrier is positioned between the inlet ports and is configured to substantially acoustically isolate one of the inlet ports from the other of the inlet ports. The diffuser is positioned at both sides of the acoustic barrier and over the respective inlet ports to diffuse air flow at both sides of the acoustic barrier. A sound signal travels through the diffuser. The acoustic barrier is adapted to delay reception of the sound signal by one of the inlet ports relative to the other of the inlet ports.

The microphone system of the present invention may be positioned at an interior rearview mirror assembly. Optionally, the microphone system of the present invention may be positioned elsewhere, such as at an accessory module of the vehicle, such as a windshield electronic module or a windshield integration module or the like, without affecting the scope of the present invention.

For example, and according to another aspect of the present invention, a microphone system of a vehicle may comprise a windshield electronic module or windshield accessory module having a housing, at least one microphone, such as a directional microphone, positioned in, at or partially within the housing, and an acoustic cover. The microphone includes at least one inlet port, and preferably separated inlet ports, for receiving audible signals from within the vehicle cabin. The acoustic cover is positioned at least partially over the inlet ports of the directional microphone and comprises a diffusing material and an outer air flow limiting layer or material or skin material positioned at least partially over the diffusing material. The air flow limiting material is configured to substantially limit air flow through the air flow limiting material, while the diffusing material is configured to space and support the air flow limiting material from the inlet ports and to substantially diffuse air flow that penetrates the air flow limiting material. The windshield accessory module may have at least a portion at, and with a view towards, the windshield of the vehicle.

Optionally, a microphone system in accordance with the present invention may be included in or at an accessory module positioned at an interior rearview mirror assembly, positioned adjacent to an interior rearview mirror assembly, included in an attachment to an interior rearview mirror assembly, and/or associated with an interior rearview mirror assembly and/or the like, without affecting the scope of the present invention. It is further envisioned that the benefits of the present invention may be achieved for a microphone, microphones or a microphone array or the like located elsewhere in the vehicle, such as at a header portion of the vehicle or at a header console or the like, without affecting the scope of the present invention. The microphone or microphones or microphone sensors or elements or arrays may be positioned at an upper portion of the mirror assembly or module or attachment, or may be positioned elsewhere at the mirror assembly, accessory module or attachment, such as a lower portion or side portion or the like, without affecting the scope of the present invention.

Therefore, the present invention provides a microphone assembly or system which is operable to substantially diffuse turbulent air flow around the microphone while providing for a directional microphone system. The air flow limiting material or skin material functions to limit the affects of turbulence by creating a buffer zone and maintaining the pressure affects out away from the microphone, while the diffusing material diffuses the air flow that does penetrate the skin material. The air flow limiting material thus substantially reduces the turbulence affects while minimizing the size of the diffusing member, in order to enhance the aesthetic quality or styling of the microphone assembly or system. The acoustic barrier or rib or dividing member functions to delay the diffused sound waves traveling along and through the diffusing material so as to have the waves influence the primary and secondary ports of the microphone at different times, thereby enhancing the directivity of the microphone. The present invention thus may function to substantially physically isolate one side of the microphone from the other via a mechanical baffle or acoustic barrier or wall between the fore and aft ports of the microphone. The microphone, system or assembly of the present invention thus accepts and substantially diffuses turbulent air around the microphone.

The present invention also provides an improved mounting structure for positioning and mounting an accessory, such as a microphone module, at least partially within the interior rearview mirror assembly. The first portion of the pocket on the mounting plate of the reflective element and the second portion of the pocket on the bezel combine or cooperate to form the pocket for at least partially receiving and retaining the accessory. By forming a portion of the pocket on one part, and forming another portion of the pocket on the other part, the present invention allows the parts (and the pocket) to come together at the right time during the manufacture or assembly of the mirror assembly, when the microphone module or accessory is provided to the mirror assembly. If the pocket were provided on a single component, the microphone module may not be readily installed or inserted therein.

These and other objects, advantages, purposes, and features of the present invention will become more apparent from the study of the following description taken in conjunction with the drawings.

BRIEF DESCRIPTION OF THE DRAWINGS

FIG. 13 is another perspective view of the interior rearview mirror assembly of FIG. 12, with the outer housing and diffuser of the microphone assembly removed to show additional details;

DESCRIPTION OF THE PREFERRED EMBODIMENTS

Figure 1:
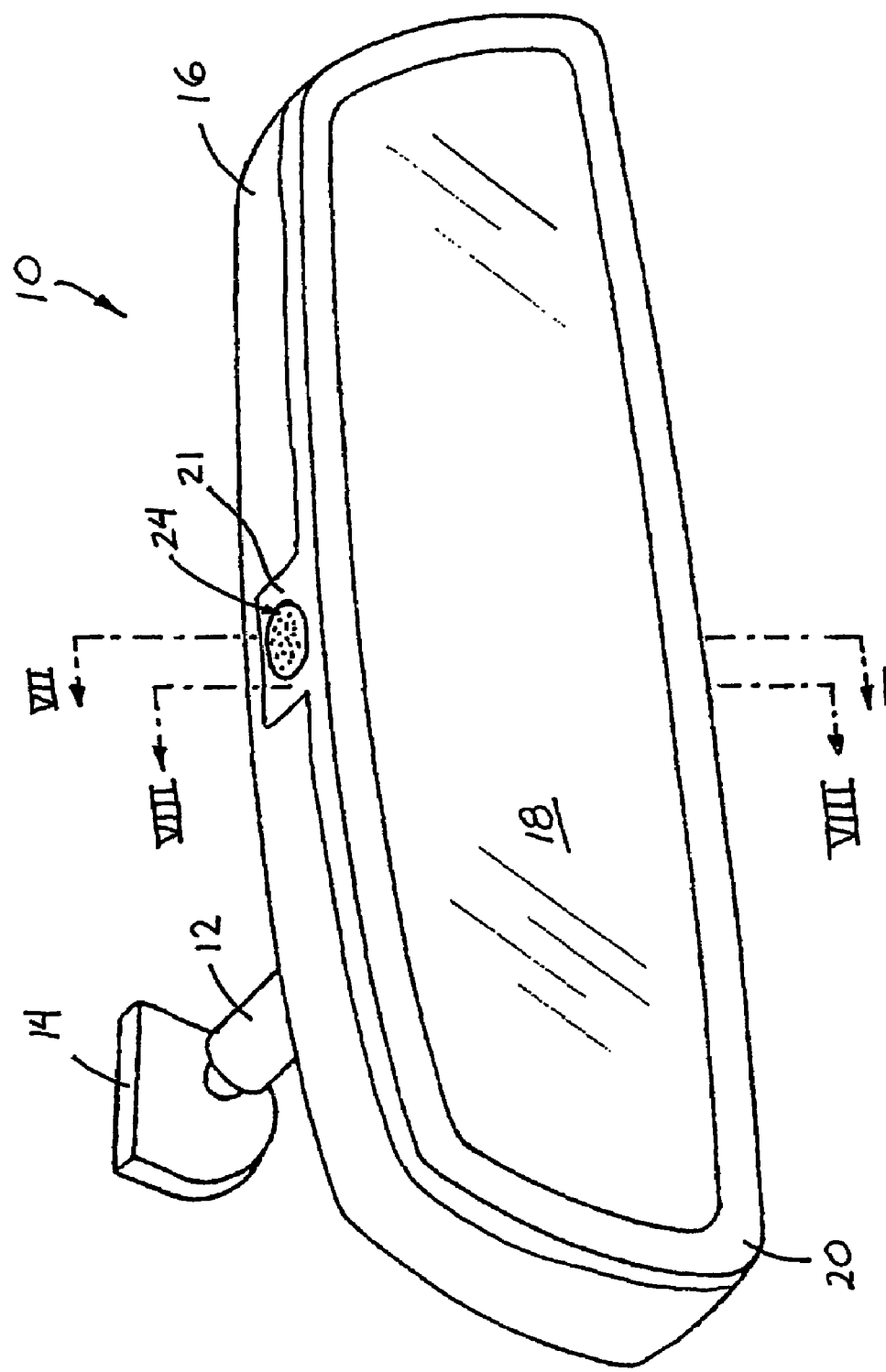
FIG. 1 is a perspective view of an interior rearview mirror assembly in accordance with the present invention.

Referring now to the drawings and the illustrative embodiments depicted therein, an interior rearview mirror assembly 10 is mounted to a mounting arm 12 and mounting base portion 14 (FIGS. 1 and 2), which may be mounted at an interior surface of a windshield of a vehicle (not shown). Mirror assembly 10 includes a housing or casing 16, a reflective element or reflective element assembly or cell 18, and a bezel 20. A mounting plate or attachment plate 22 is positioned on a rear surface 18a (FIGS. 4-10) of reflective element assembly 18 and includes a partial pocket or platform 23 which combines with an accessory tab 21 of bezel 20 to define an accessory pocket for at least partially receiving an accessory 24 therein, as discussed below.

Accessory 24 may be a microphone module or assembly or the like for receiving audio or voice signals from within the cabin of the vehicle. The microphone module may be part of a voice acquisition system, a telecommunication system, a telematics system or the like, and may be of the types disclosed in U.S. Pat. Nos. 6,243,003; 6,278,377 and 6,420,975, which are hereby incorporated herein by reference. The microphone module may include a single microphone sensor or element or may include a plurality of microphone sensors or elements, such as a two element microphone sensor array or a four element microphone sensor array or the like, without affecting the scope of the present invention. The term microphone or microphone module or the like as used herein is intended to encompass any microphone or microphone assembly or module having a single microphone element or sensor or a plurality of microphone sensors or elements, such as a two element array or a four element array or the like.

Microphone module 24 includes a wire or connector 24a extending therefrom for electrically connecting microphone module 24 to a printed circuit board 26 mounted on mounting plate 22. Microphone module 24 includes a housing portion 24b, which substantially encases an audio receiving portion or microphone sensing element 24c (or multiple microphone sensing elements such as in a microphone array), an electronic circuit board 24d, a microphone boot 24e and a wind screen 24f and weather barrier 24g, as best shown in FIGS. 3A-D. The boot 24e and microphone sensing element 24c are positioned within a protruding portion 24h of housing 24b, such that the microphone sensing element 24c may be positioned toward an outer surface of the mirror assembly when the microphone module 24 is assembled to the mirror assembly, as discussed below. The microphone module 24 thus preferably forms a small, unitary or stand alone microphone module which may be purchased separately by the mirror manufacturer and provided to or assembled in the mirror assembly by the mirror manufacturer, as discussed below.

The microphone module 24 may be received within a flexible rubber grommet 25, which substantially encases the housing portion 24b of microphone module 24 and functions to flexibly engage the walls of the partial pocket 23 and/or the accessory tab 21 to snugly secure microphone module 24 within the pocket, as discussed below. Grommet 25 preferably includes a plurality of wipers or ridges or ribs 25d, 25e, 25f extending from an upper surface 25a, ends 25b and rear side 25c, respectively, for flexible engagement with the accessory tab 21, the side walls 23b of partial pocket 23 and/or the casing 16 of mirror assembly 10, as discussed below. The ridges 25a, 25b, 25c may be soft pliable ridges which flex and/or compress when they come in contact with the respective engaging surfaces, so as to substantially retain microphone module 24 in position within the pocket. The wipers or ridges of grommet 25 may provide vibration dampening.

In the illustrated embodiment, the mirror assembly 10 comprises an electrochromic mirror assembly and includes an electrochromic reflective element assembly or cell 18. The electrochromic reflective element assembly 18 may be purchased by the mirror manufacturer as a kit 19, which includes the mounting plate 22 and circuit board 26 mounted thereon. The reflective element kit 19 may then be dropped into or installed into the bezel 20 to form a bezel assembly 30 (FIGS. 2 and 4-6), which is then snapped or otherwise secured to the casing 16 of mirror assembly 10 or vice versa. The microphone module 24 may be provided between the partial pocket 23 of mounting plate 22 and the accessory tab 21 of bezel 20 as the reflective element kit 19 is at least partially received in the bezel, whereby the structures of the mounting plate and bezel cooperate to substantially retain and secure the microphone module therebetween, as discussed below. Bezel assembly 30 thus may include the bezel 20, the reflective element assembly 18, the mounting plate 22, the microphone module 24 and a printed circuit board 26.

Mounting plate 22 may comprise a generally planar, plastic plate which may be secured, such as by suitable adhesives or the like, to rear surface 18a of the reflective element assembly 18. A layer of tape or adhesive 27 (FIG. 2) may be applied to the rear surface 18a of the reflective element assembly between reflective element assembly 18 and mounting plate 22. Partial pocket 23 extends rearwardly from mounting plate 22 along an upper or lower edge of mounting plate 22. In the illustrated embodiment, the partial pocket 23 extends from an upper edge 22a of mounting plate 22 such that microphone module 24 is positioned along an upper surface of the mirror assembly 10. However, the partial pocket may be formed along a lower edge of the mounting plate or even along one or both sides of the mounting plate to position the microphone module or accessory elsewhere around the mounting plate, without affecting the scope of the present invention. Mounting plate 22 typically has snaps or clips 22b for mounting a printed circuit board 26 (PCB) offset or stood off from the rear surface of the mounting plate, as discussed below.

Figure 5:
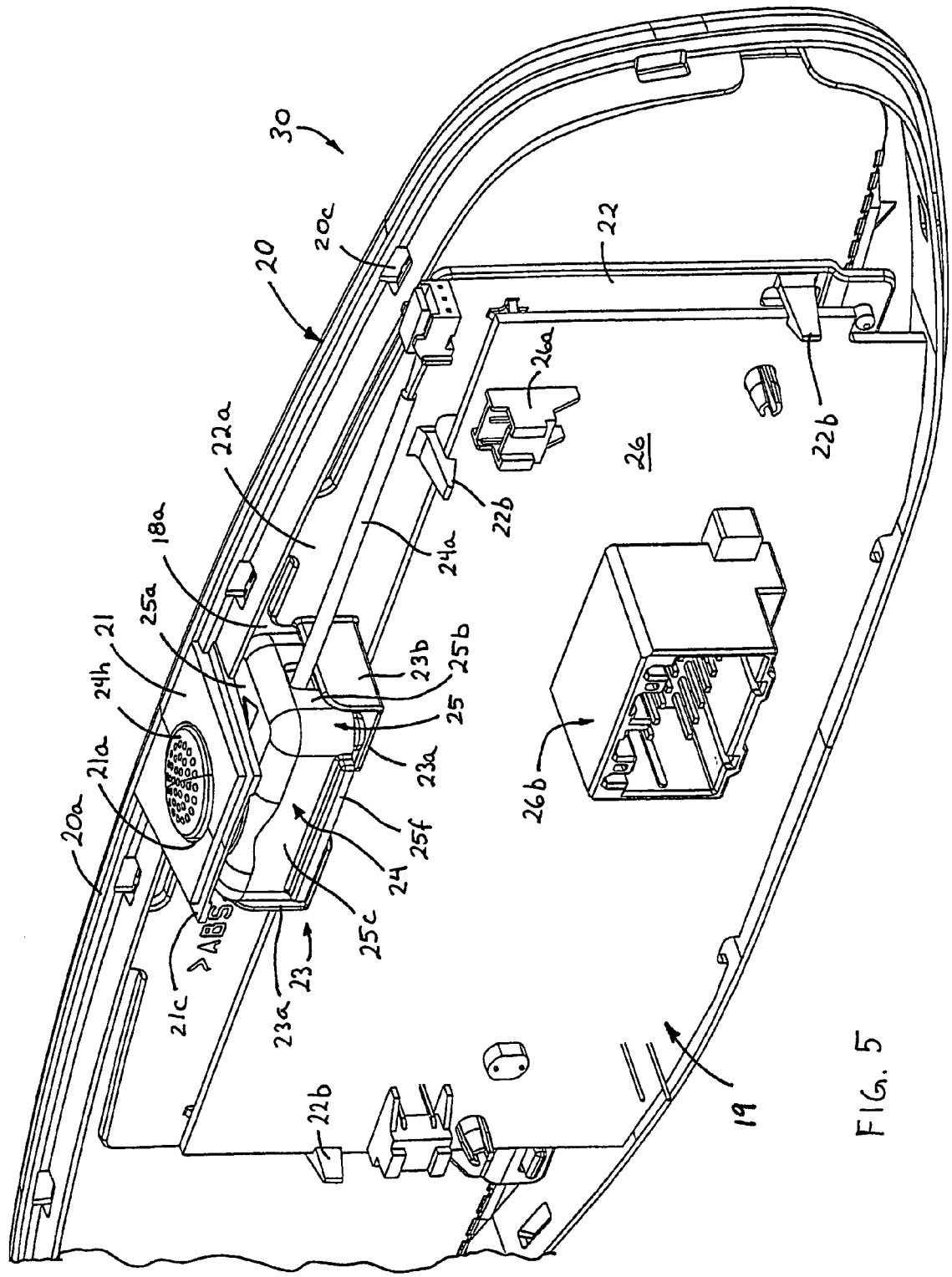
FIG. 5 is another perspective view of the rear portion of the bezel and reflective element assembly of the interior rearview mirror assembly of FIGS. 2 and 4.

Partial pocket 23 includes a base portion or surface 23a and a pair of opposite side walls 23b extending upward from base portion 23a. The rear surface 18a of reflective element assembly 18 defines a third wall of partial pocket 23 when mounting plate 22 is secured to reflective element assembly 18 (however, a surface of mounting plate 22 may provide the third wall of the pocket, without affecting the scope of the present invention). As best seen in FIG. 5, microphone module 24 rests within the partial pocket 23, whereby connector 24a extends toward and may connect to a connector or socket 26a of a printed circuit board 26, discussed below. The ridge 25e of at least one end 25b of grommet 25 flexibly and/or compressibly engages at least one side wall 23b of partial pocket 23, while the forward surface or wall 25g may be substantially flat and may compress as the grommet presses against rear surface 18a of reflective element assembly 18, in response to microphone module 24 being inserted into partial pocket 23. The microphone module 24 is thus retained within the partial pocket 23, such that the microphone module 24 is in the proper position during assembly of the reflective element and mounting plate to the bezel 20, whereby the microphone module will be further positively retained by the accessory tab 21 of the bezel 20, as discussed below.

Accessory tab 21 of bezel 20 extends rearward (away from the viewable surface of the mirror assembly) from an upper rim or portion 20a of bezel 20. Tab 21 provides an aperture or opening 21a therethrough for receiving the protruding portion 24h of microphone housing 24b when reflective element assembly 18 and mounting plate 22 are secured to bezel 20, with microphone module 24 positioned at least partially within the pocket 23. Accessory tab 21 is a thin plastic tab which preferably flexes to allow insertion of the protruding portion 24h into the opening 21a, but is biased to flex back toward its original state to retain the microphone module 24 within the pocket.

Figure 4:
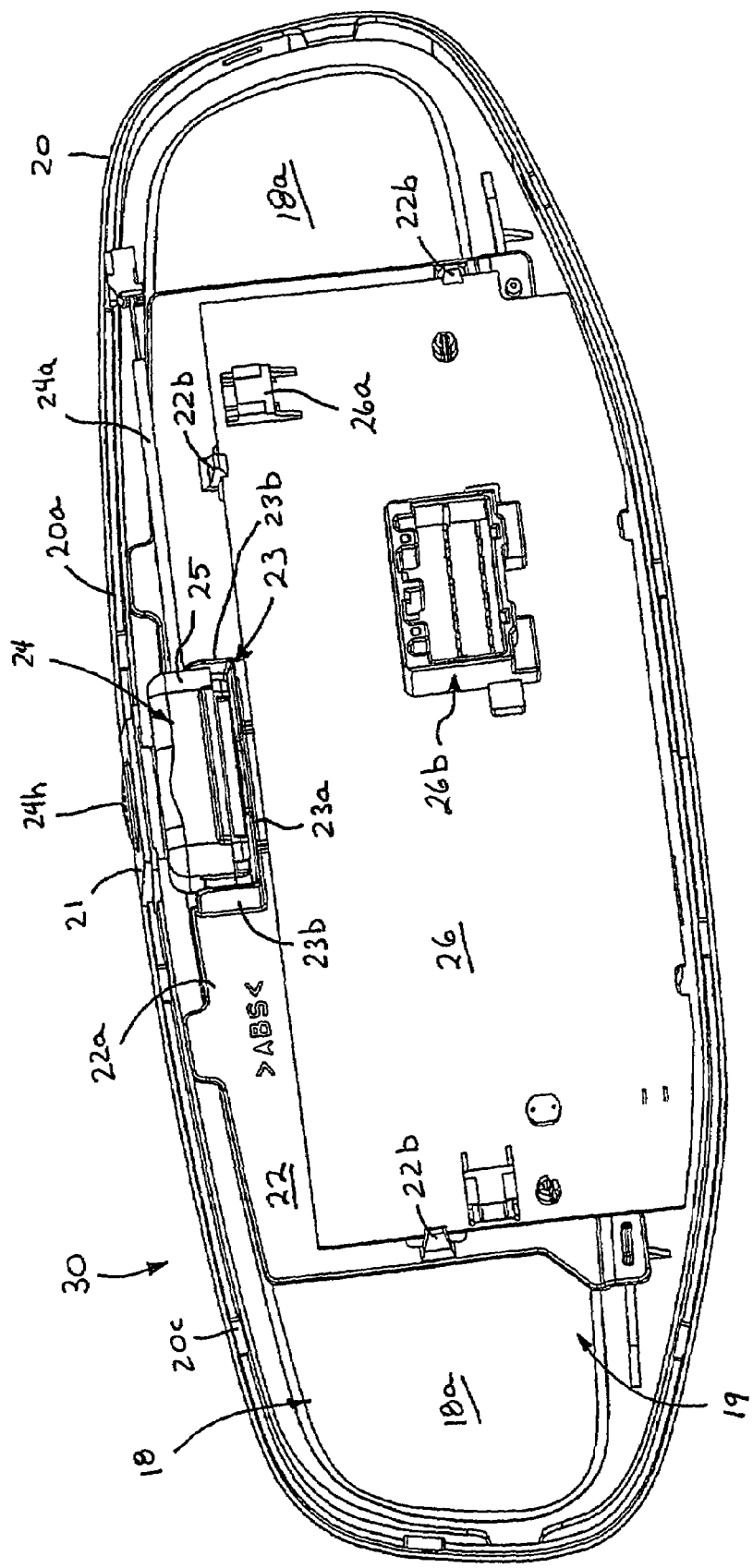
FIG. 4 is a perspective view of a rear portion of a bezel and reflective element assembly of the interior rearview mirror assembly of FIG. 2, showing the accessory partially within a pocket.
Figure 6:
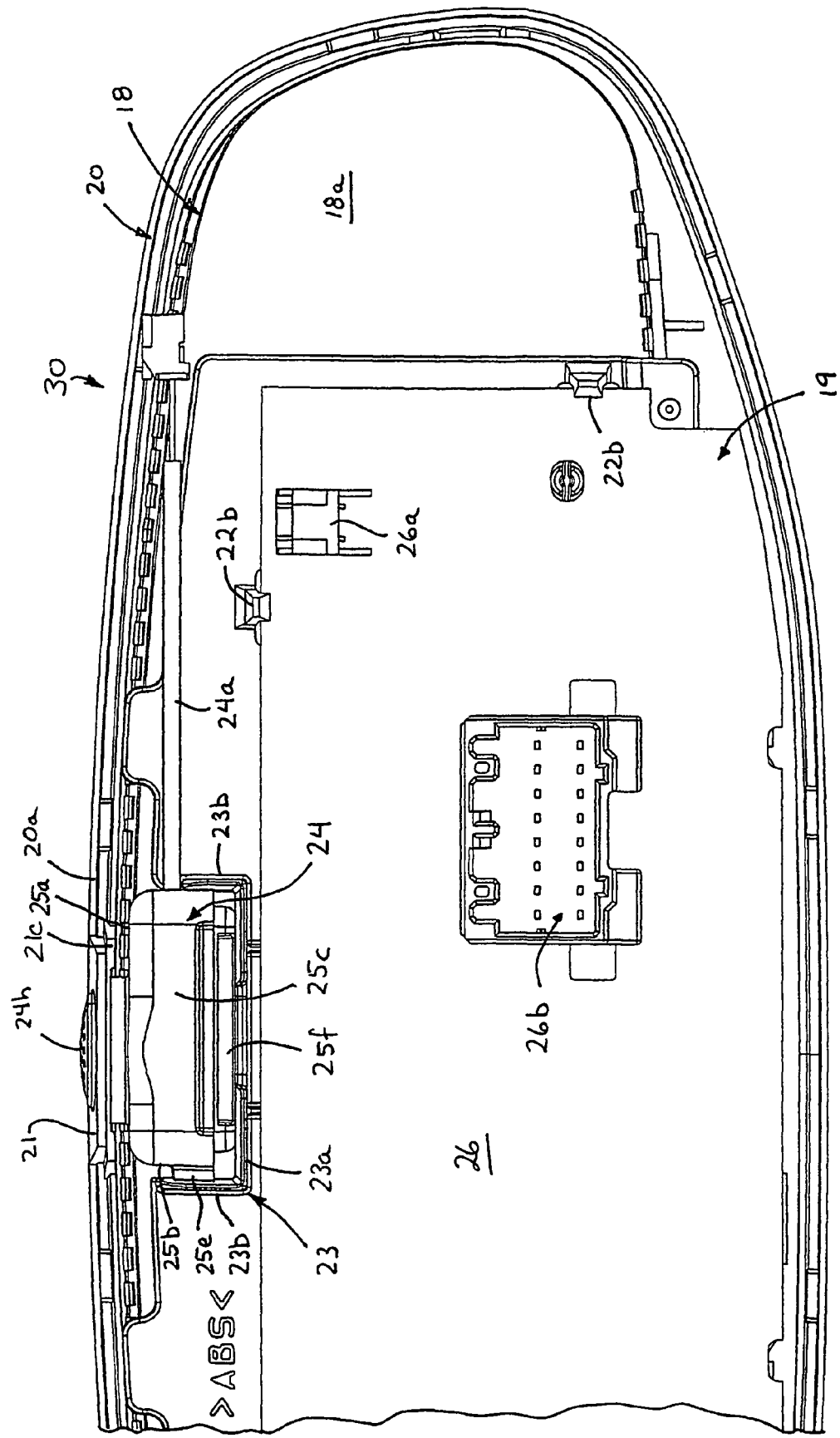
FIG. 6 is a plan view of the rear portion of the bezel and reflective element assembly of the interior rearview mirror assembly of FIGS. 2, 4 and 5.

As best seen in FIGS. 4-6, microphone module 24 may be retained within the pocket or partial pocket 23 by base portion 23a and accessory tab 21, which at least partially receives the microphone sensing element 24c of microphone module 24 through opening 21a, and flexes down to engage the ridges 25d of the upper surface or portion 25a of grommet 25 of microphone module 24, in order to positively retain microphone module 24 within the pocket. The walls of the opening 21a and the side walls 23b of partial pocket 23 function to limit or substantially preclude lateral movement of microphone module 24 within the pocket.

The reflective element kit 19 preferably includes printed circuit board (PCB) 26 attached to mounting plate 22. An example of such an arrangement as disclosed in commonly assigned U.S. Pat. No. 5,820,245, which is incorporated in its entirety by reference herein. The printed circuit board 26 may snap, clip or otherwise attach or fasten to the plastic mounting plate 22 (such as via one or more plastic, flexible tabs or hooks or retainers 22b extending from mounting plate 22). Preferably, the circuit board 26 is spaced or offset from mounting plate 22 via spacers or the like, to allow space for components or circuitry on either side of circuit board 26. Alternately, circuit board 26 may be independently supported from the reflective element assembly 18 or in the casing 16. Reference is made to U.S. Pat. Nos. 5,671,996 and 5,820,245, and to U.S. provisional application Ser. No. 60/500,858, filed Sep. 5, 2003 by Kulas et al. for INTERIOR REARVIEW MIRROR ASSEMBLY; and Ser. No. 60/471,546, filed May 19, 2003 by Uken et al. for MIRROR ASSEMBLY FOR VEHICLE, the disclosures of which are hereby incorporated herein by reference in their entireties.

Figure 2:
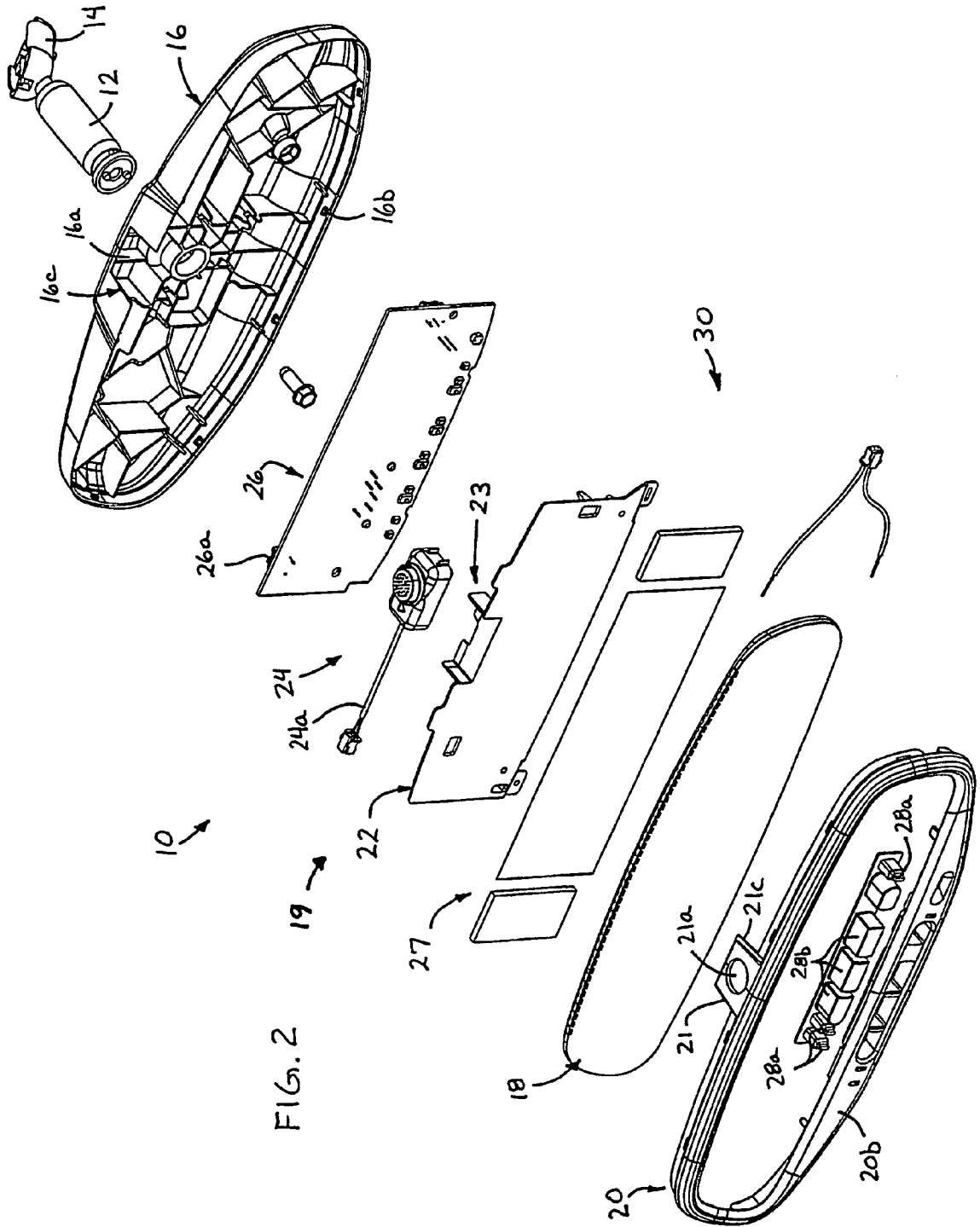
FIG. 2 is an exploded perspective view of an interior rearview mirror assembly in accordance with the present invention.
Figure 3B:
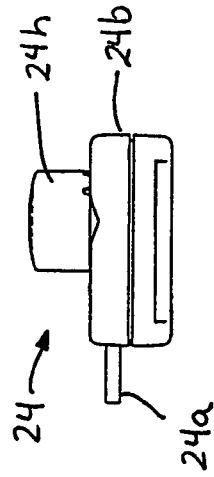
FIGS. 3B-D are side elevations and a top plan view of the assembled microphone module of FIG. 3A, without the rubber grommet.
Figure 3C:
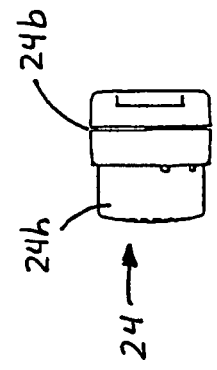
Figure 3D:
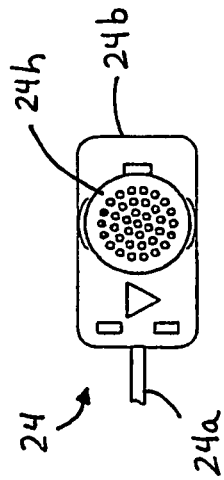
Figure 3A:
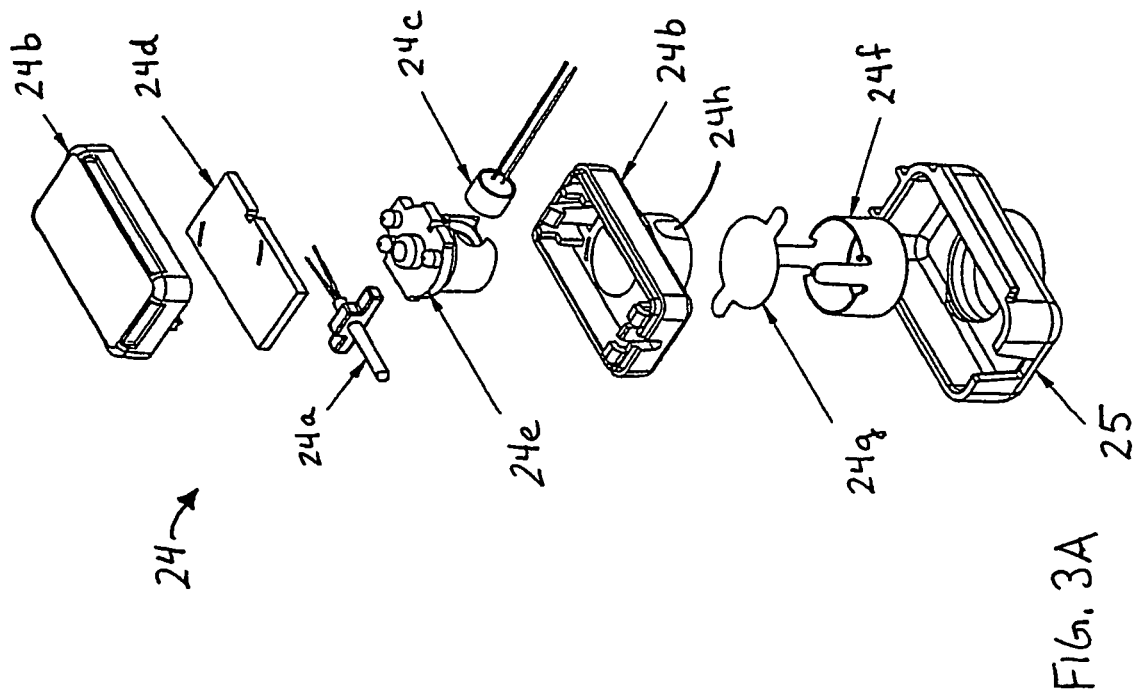
FIG. 3A is an exploded perspective view of a microphone module useful with the present invention.

The circuit board 26 may support, for example, light emitting diodes (LEDs) 28a for providing illumination or indicators or for illuminating indicia on display elements provided on the chin 20b of the bezel 20 of the mirror assembly or display devices provided on the reflective element, or map or dash board lights or the like (FIG. 2). The circuit board 26 may also or otherwise support, for example, user interface buttons or actuators 28b at the chin 20b of elsewhere on mirror assembly 10 for providing control input to the circuit board from a driver or passenger within the cabin of the vehicle. Circuit board 26 also includes a connector or plug or socket 26b for connecting to a wiring feed (not shown) from the vehicle wiring to provide power to and communication to and from the mirror assembly.

During assembly of mirror assembly 10, microphone module 24 is placed at least partially in partial pocket 23 and retained therein by ridges 25e of grommet 25 engaging wall 23b, while the opposite wall 25b of grommet engages the other wall 23b of partial pocket or platform 23, thereby limiting movement of microphone module 24 within the partial pocket 23. As the reflective element assembly 18, mounting plate 22 and microphone module 24 are at least partially received in or mounted to bezel 20, accessory tab 21 flexes as it engages the protruding portion 24h of microphone module 24, and then snaps or flexes back down as protruding portion 24h inserts at least partially through opening 21a of accessory tab 21. Also, as the reflective element assembly and circuit board are mounted or attached to bezel 20, the lights, controls and/or the like on circuit board 26 are aligned with the openings, buttons and/or the like at the chin 20b of bezel 20. The combination and cooperation of the accessory tab 21 around protruding portion 24h of microphone module 24 and the walls 23b and base 23a of the mounting plate 22 function to substantially retain microphone module 24 at least partially within the bezel assembly 30. Also, the wiring or connector 24a of microphone module 24 may be plugged into or otherwise connected to the connector or socket 26a in the printed circuit board 26.

Figure 7:
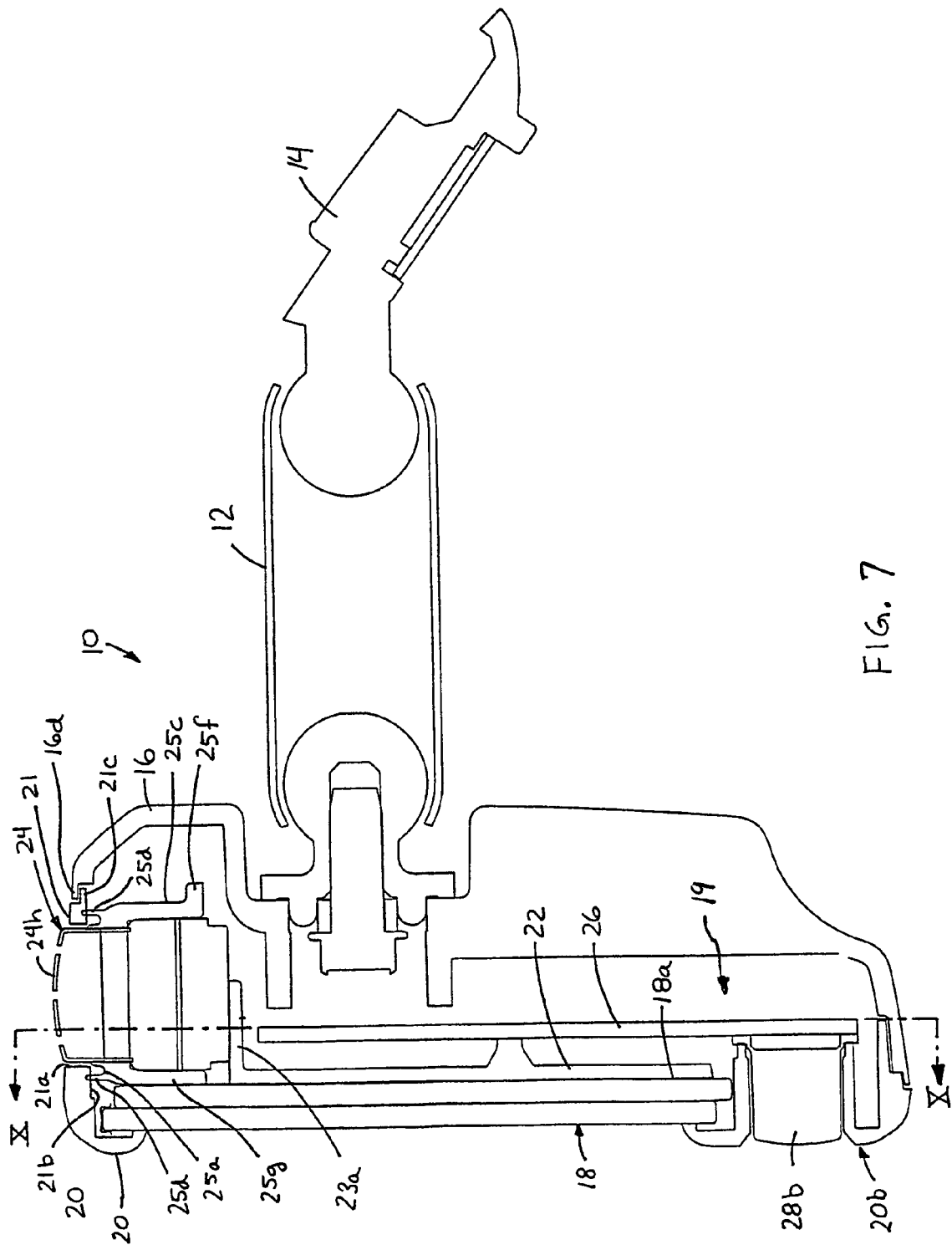
FIG. 7 is a sectional view of the mirror assembly taken along the line VII-VII of FIG. 1.
Figure 8:
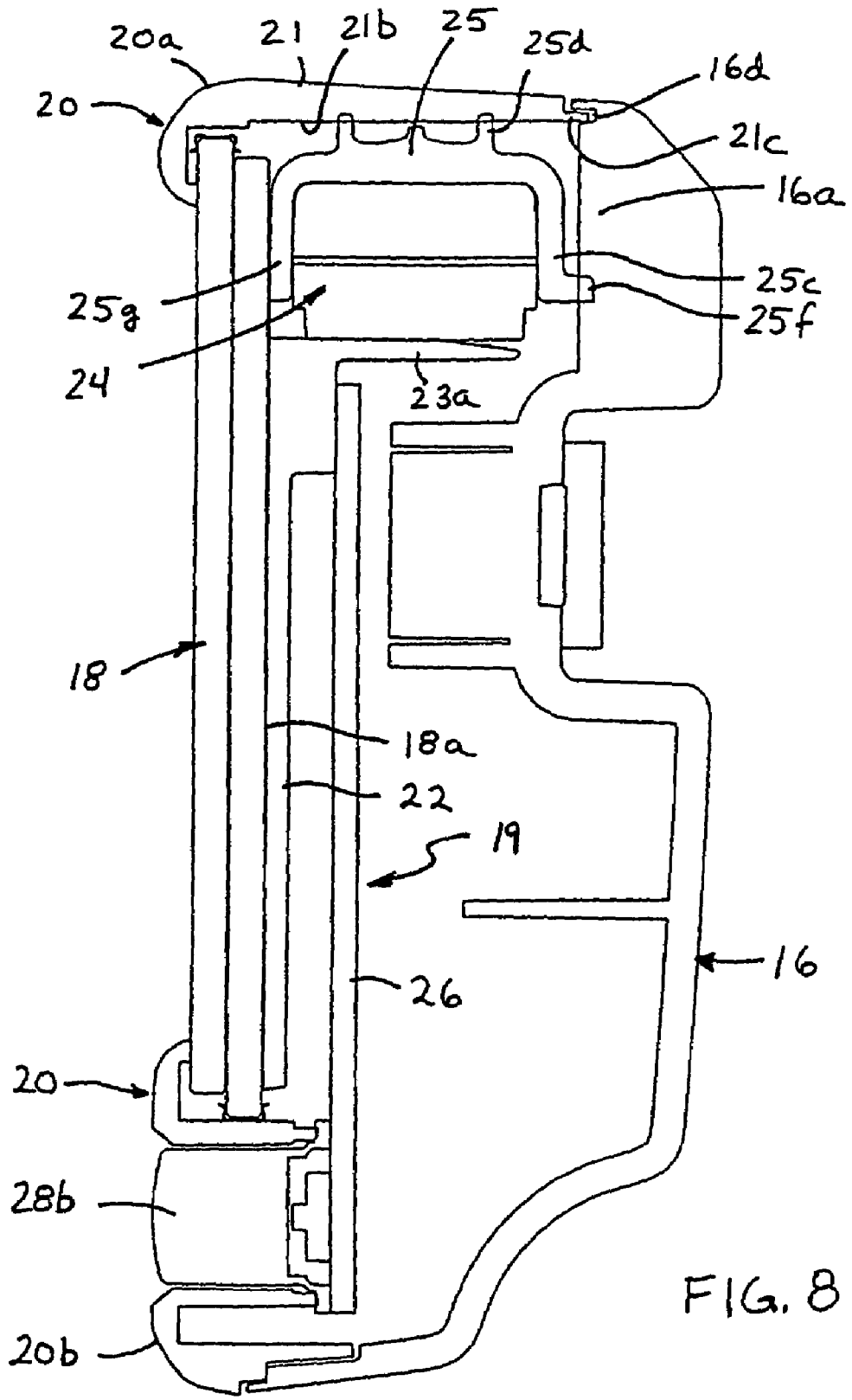
FIG. 8 is another sectional view of the mirror assembly taken along the line VIII-VIII of FIG. 1.
Figure 9:
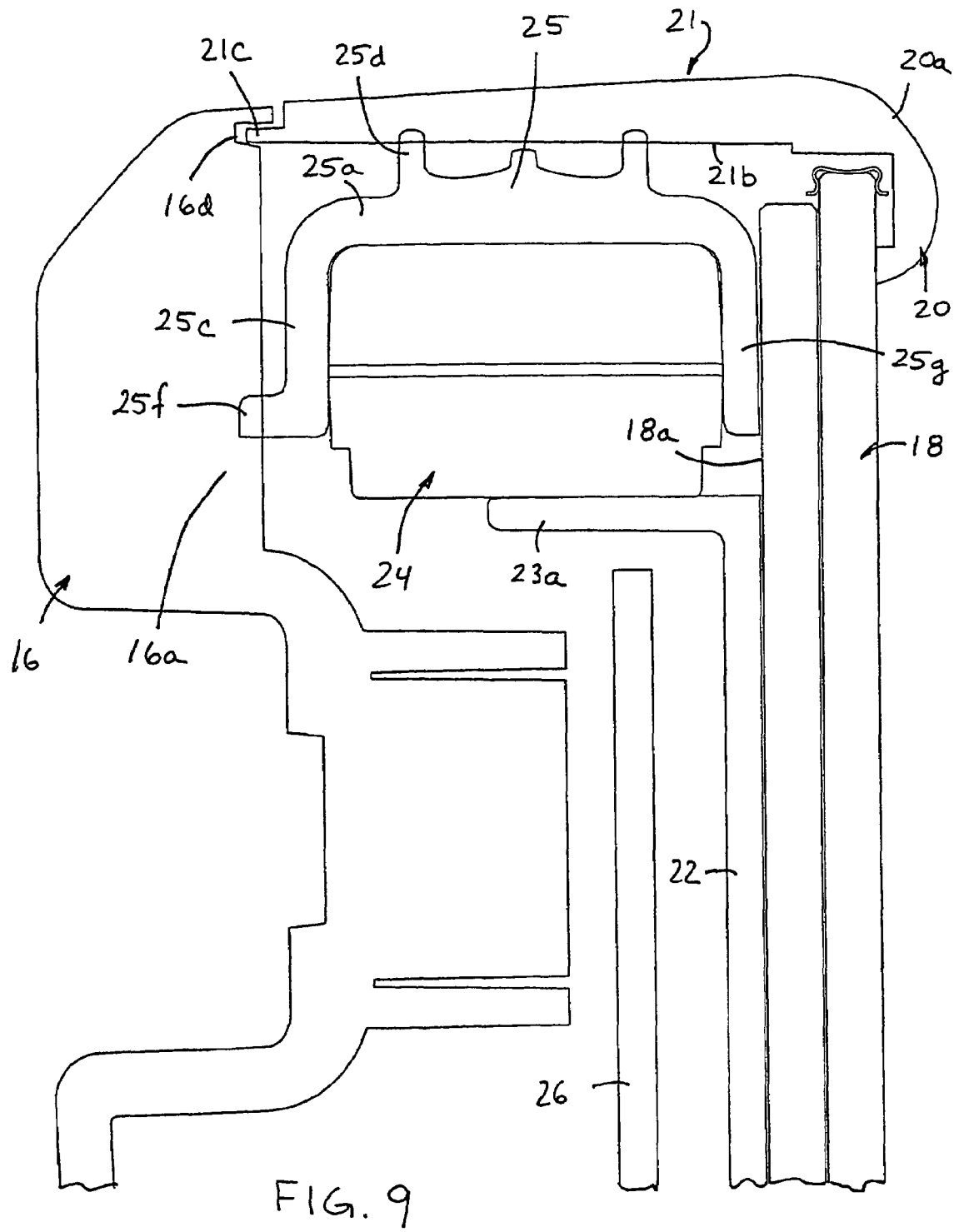
FIG. 9 is an enlarged sectional view of the accessory and pocket shown in FIG. 8.
Figure 10:
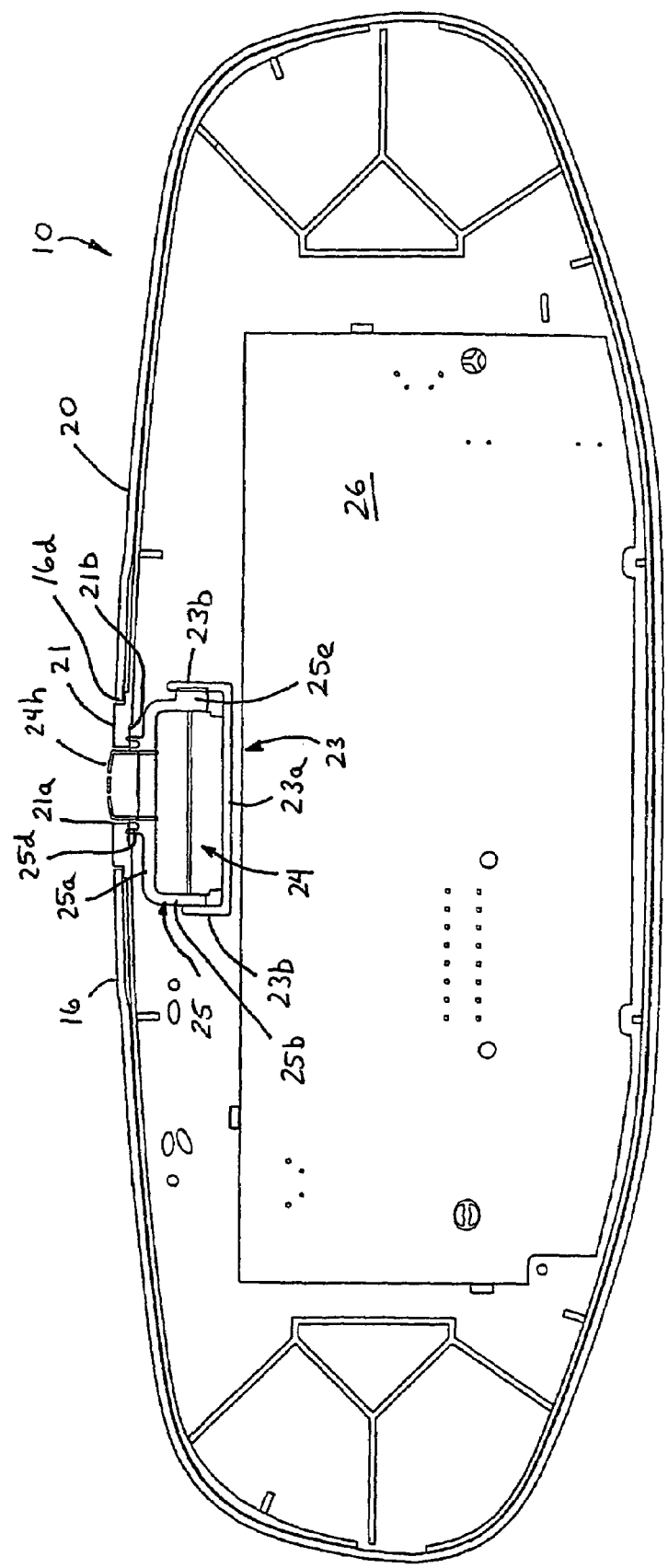
FIG. 10 is a sectional view of the mirror assembly taken along the line X-X of FIG. 7.
Figure 11:
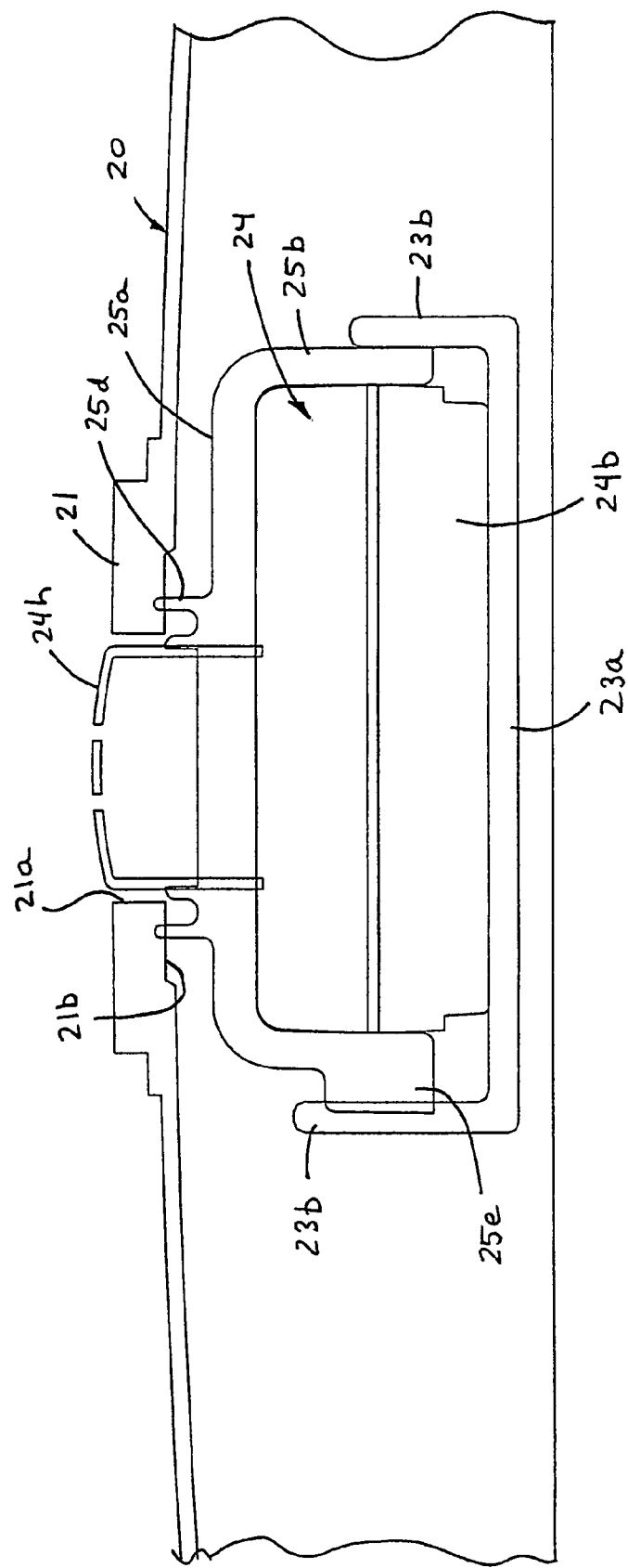
FIG. 11 is an enlarged sectional view of the accessory and pocket shown in FIG. 10.

After assembly of the bezel assembly 30 is completed, microphone module 24 is substantially retained by the platform or partial pocket 23 of the mounting plate 22 and the accessory tab 21 of the bezel 20. The bezel assembly 30 may then be snapped or otherwise secured as a unit to the casing 16 of mirror assembly 10. As best seen in FIGS. 2 and 5, bezel 20 and/or casing 16 may include tabs or hooks or fasteners or the like 20c, 16b, which provide a snap connection of bezel 20 to casing 16. As shown in FIG. 2, casing 16 includes a recessed region 16c for receiving accessory tab 21, microphone module 24 and partial pocket 23 therein when bezel assembly 30 is secured to casing 16. Accessory tab 21 may include a laterally extending ridge or tab 21c and the recessed region 16c of casing 16 may include a corresponding groove or tab 16d (FIGS. 7-9) around the outer surface of recessed region 16c, such that ridge 21c may engage and extend at least partially within groove 16d when bezel assembly 30 is mounted to or secured to casing 16, as best shown in FIGS. 7-9. The tongue and groove type interface between accessory tab 21 and casing 16 functions to maintain accessory tab 21 in position relative to casing 16, such that the accessory tab 21 and microphone module 24 may be generally flush with the outer surface of the casing of the mirror assembly. Flexible ridge 25*f* along rearward side 25*c* of grommet 25 flexibly engages one or more ribs or surfaces 16*a* (FIGS. 2 and 8) of casing 16 when bezel 20 is snapped or otherwise secured to casing 16, as shown in FIG. 1.

In the illustrated embodiment, reflective element assembly or cell 18 comprises an electro-optic or electrochromic or variable reflectance reflective element assembly or cell, which includes an electrochromic medium disposed therein. The electrochromic medium changes color or darkens in response to electricity or voltage applied to or through the conductive layers at either side of the electrochromic medium. The electrochromic medium may be a solid polymer matrix electrochromic medium, such as is disclosed in U.S. Pat. No. 6,154,306, which is hereby incorporated by reference herein, or other suitable medium, such as a liquid or solid medium or thin film or the like, such as the types disclosed in U.S. patent application Ser. No. 09/793,002, entitled VIDEO MIRROR SYSTEMS INCORPORATING AN ACCESSORY MODULE, filed Feb. 26, 2001, now U.S. Pat. No. 6,690,268, and in U.S. Pat. Nos. 5,668,663 and 5,724,187, the entire disclosures of which are hereby incorporated by reference herein, without affecting the scope of the present invention. The electrochromic reflective element assembly may utilize the principles disclosed in commonly assigned U.S. Pat. Nos. 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 or 4,712,879, which are hereby incorporated herein by reference, or as disclosed in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Wash. (1990), which are hereby incorporated by reference herein, and in U.S. patent application Ser. No. 09/792,002, filed Feb. 26, 2001 by Schofield et al. for VIDEO MIRROR SYSTEMS INCORPORATING AN ACCESSORY MODULE, now U.S. Pat. No. 6,690,268, which is hereby incorporated herein by reference.

The printed circuit board 26 may include electronic or electrical circuitry for actuating the variable reflectance of the reflective element assembly and for operating other electrical or electronic functions supported in the rearview mirror assembly. The printed circuit board 26 optionally may include glare sensing and ambient photo sensors and electrochromic circuitry that automatically dims the reflectivity of the electrochromic mirror element or reflective element assembly when glare conditions are detected, such as at nighttime or the like.

Although shown and described as being an electro-optic or electrochromic reflective element assembly, the reflective element assembly 18 of mirror assembly 10 may otherwise be a prismatic reflective element, without affecting the scope of the present invention. The prismatic reflective element may comprise a single wedge-shaped substrate or the like, and may attach a mounting plate and/or circuit board thereon, as is known in the art.

As shown in FIGS. 2 and 7, interior rearview mirror assembly 10 may include a pivotable mounting arm 12 which pivotally receives a ball member 12*a*, 12*b* therein at each end. However, interior rearview mirror assembly 10 may otherwise mount to the end of the mirror mount 14, without affecting the scope of the present invention. The mirror and accessory mounting components may provide a breakaway type connection or mount, such as the types disclosed in U.S. Pat. Nos. 6,172,613; 6,087,953; 5,820,097; 5,377,949; and/or 5,330,149, which are hereby incorporated herein by reference. The interior rearview mirror assembly may be pivotable about the mounting arm to adjust the reflective element between a daytime position or orientation and a nighttime position or orientation via a flip or toggle assembly or device, such as the types disclosed in U.S. Pat. No. 6,318,870; and/or U.S. provisional application Ser. No. 60/500,858, filed Sep. 5, 2003 by Kulas et al. for INTERIOR REARVIEW MIRROR ASSEMBLY, which are hereby incorporated herein by reference. Optionally, the mirror assembly may incorporate other aspects, such as those described in U.S. provisional application Ser. No. 60/471,546, filed May 19, 2003 by Uken et al. for MIRROR ASSEMBLY FOR VEHICLE, which is hereby incorporated herein by reference.

Rearview minor assembly 10 may also include or house a plurality of electrical or electronic devices, such as antennas, including global positioning system (GPS) or cellular phone antennas, such as disclosed in U.S. Pat. No. 5,971,552, a communication module, such as disclosed in U.S. Pat. No. 5,798,688, displays, such as shown in U.S. Pat. Nos. 5,530,240 and 6,329,925, blind spot detection systems, such as disclosed in U.S. Pat. Nos. 5,929,786 or 5,786,772, transmitters and/or receivers, such as garage door openers, a digital network, such as described in U.S. Pat. No. 5,798,575, a high/low head lamp controller, such as disclosed in U.S. Pat. No. 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and 5,877,897, a remote keyless entry receiver, map lights, such as disclosed in U.S. Pat. Nos. 5,938,321; 5,813,745; 5,820,245; 5,673,994; 5,649,756; or 5,178,448, microphones, such as disclosed in U.S. Pat. Nos. 6,243,003; 6,278,377 and 6,420,975, speakers, a compass, such as disclosed in U.S. Pat. No. 5,924,212 and/or U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, a seat occupancy detector, a trip computer, an ONSTAR® system or the like (with all of the above-referenced patents and applications commonly assigned to Donnelly Corporation, and with the disclosures of the referenced patents and applications being hereby incorporated herein by reference in their entireties).

Therefore, the present invention provides a pocket or retainer for an accessory or microphone for a mirror assembly which may be preassembled and secured to a bezel assembly, which then may be easily mounted to a casing as a preassembled unit, thereby substantially easing assembly of the mirror assembly. The accessory tab of the bezel and the platform of the mounting plate of the reflective element kit or assembly combine to form the pocket for at least partially receiving and retaining the accessory. By providing the retaining portions on two separate components (the bezel and the mounting plate), the present invention provides for easy assembly and installation of the microphone module within the pocket, since the pocket is formed when the two components are assembled together, and the microphone module is provided between the parts and within the pocket at the time that the two components are assembled together. By forming a portion of the pocket on one part, and forming another portion of the pocket on the other part, the present invention allows the parts (and the pocket) to come together at the right time during the manufacture or assembly of the mirror assembly, when the microphone module or accessory is provided to the mirror assembly. If the pocket were provided on a single component, the microphone module would not be readily installed or inserted therein.

The accessory or microphone module may be connected to the printed circuit board (which is preferably also mounted to the mounting plate), such that all connections of the accessory are completed before the casing of the mirror assembly is attached to the bezel. The bezel assembly may then be easily snapped or otherwise secured to the casing to complete the assembly of the mirror assembly. Preferably, the accessory includes a soft, flexible grommet or isolator which engages the mounting plate, accessory tab, and/or casing to provide securement of the accessory within the mirror assembly.

Figure 12:
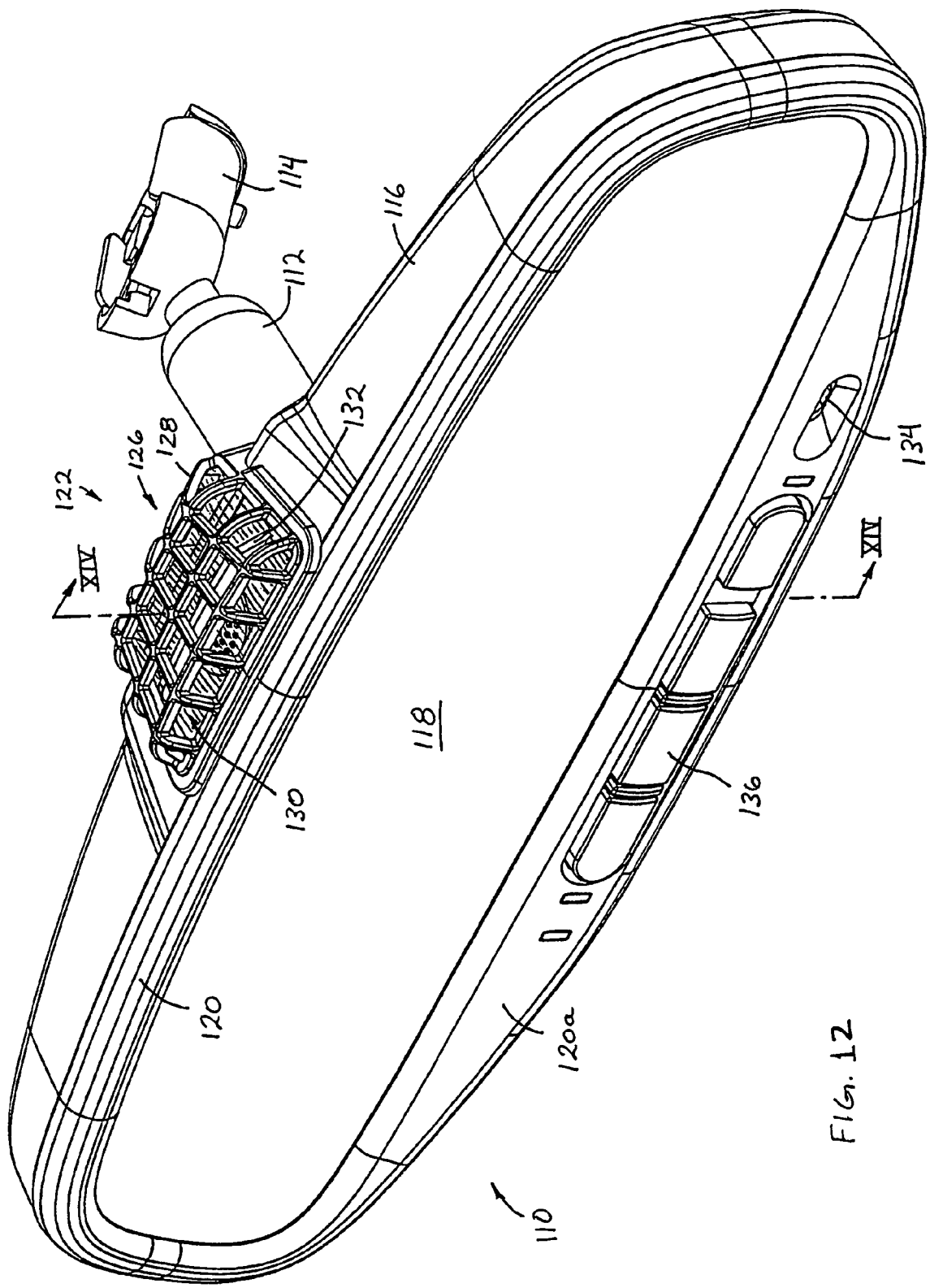
FIG. 12 is a perspective view of another interior rearview mirror assembly with a microphone module or assembly in accordance with the present invention.
Figure 14:
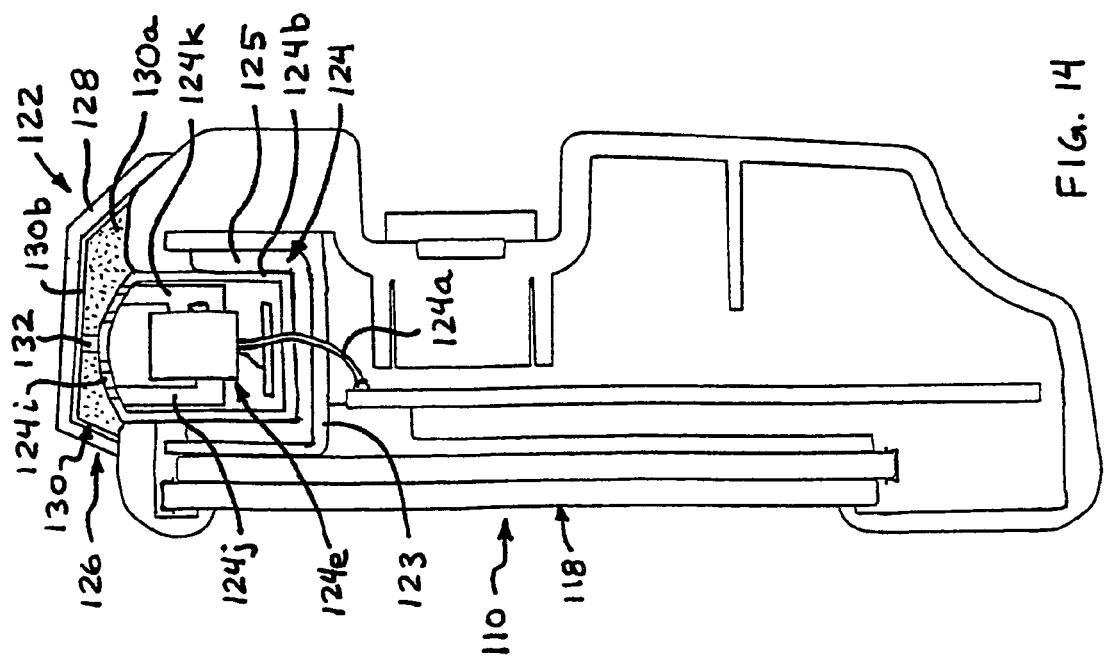
FIG. 14 is a sectional view of the mirror assembly and microphone assembly, taken along the line XIV-XIV in FIG. 12.

Referring now to FIGS. 12-16, an interior rearview mirror assembly 110 is mounted to a mounting arm 112 and mounting base portion 114 (FIGS. 12 and 13), which may be mounted at an interior surface of a windshield of a vehicle (not shown). Mirror assembly 110 includes a housing or casing 116, a reflective element 118, and a bezel 120. A microphone assembly or system 122 is positioned at mirror assembly 110, and preferably in or at an upper region of the mirror assembly, such as within an upper portion of mirror assembly 110 as shown in FIGS. 12-14. Microphone assembly 122 includes a microphone module 124 (FIG. 14), which preferably comprises a directional microphone module, and an acoustic cover or diffuser cover or cover assembly 126 positioned over or at least partially over or at least partially around the microphone module.

As shown in FIGS. 12 and 13, interior rearview mirror assembly 110 may include a pivotable mounting arm 112 which pivotally receives a ball member therein at each end. However, interior rearview mirror assembly 110 may otherwise mount to the end of the mirror mount 114, without affecting the scope of the present invention. The mirror and accessory mounting components may provide a breakaway type connection or mount, such as the types disclosed in U.S. Pat. Nos. 6,172,613; 6,087,953; 5,820,097; 5,377,949; and/or 5,330,149, which are hereby incorporated herein by reference.

Because turbulent air may be present in the area or region immediately surrounding microphone module 124, particularly when the windshield defogger or defroster is activated, and because such turbulent air may have an adverse impact on the performance of the microphone module, it is desirable to reduce the affects that such turbulent air has on the microphone module. It has been proposed or suggested in the art to deflect air away from the microphone sensing elements to reduce the effects of such turbulence, such as described in International Publication No. WO 01/37519 A2, which is hereby incorporated herein by reference. However, such deflectors may be sensitive to wind blowing through the vehicle, such as when the windows of the vehicle are open. Such deflectors may also have other disadvantages, particularly an adverse impact of the styling of the interior rearview mirror assembly. In order to avoid such deflectors and the like, the microphone assembly of the present invention includes diffuser cover 126 positioned at the outer end of the microphone module 124 to accept and diffuse the turbulent air flow in the vicinity of the microphone without adversely affecting the performance of the microphone and while providing the desired directivity of the microphone assembly or system, as discussed below.

Microphone module 124 is operable to receive audio or voice signals from within the cabin of the vehicle. The microphone module may provide sound capture for a voice acquisition system, a telecommunication system, a telematics system or the like, such as for a hands free cell phone system, an audio recording system and/or an emergency communication system, and may be of the types disclosed in U.S. Pat. Nos. 6,243,003; 6,278,377 and 6,420,975, which are hereby incorporated herein by reference. Microphone module 124 includes a wire or connector 124a extending therefrom for electrically connecting microphone module 124 to a printed circuit board (not shown in FIGS. 12-16), which may be positioned within mirror assembly 110. However, although shown and described as being positioned at and partially within the interior rearview mirror assembly 110, the microphone assembly 122 and/or any associated circuitry or circuit board may be positioned adjacent to the interior rearview mirror assembly, or may be included in an attachment to the interior rearview mirror assembly, or may be included in a module associated with the interior rearview mirror assembly, or may be included in a windshield electronic module or the like, without affecting the scope of the present invention.

Microphone module 124 may comprise a generally unidirectional microphone which is operable to receive audible signals from the cabin of the vehicle, such as from the driver and/or passenger areas, while substantially filtering or canceling out audible signals from other areas, such as from the windshield area of the vehicle. Microphone module 124 may be positioned at least partially within the mirror casing 116, and may be positioned at the junction of the bezel 120 and the mirror casing 116, such as in a manner similar to the microphone module mounting pocket described above with respect to mirror assembly 10 and/or as described below with respect to mirror assembly 110'. Optionally, microphone module 124 may be positioned within a cavity formed in casing 116, without affecting the scope of the present invention.

Figure 16:
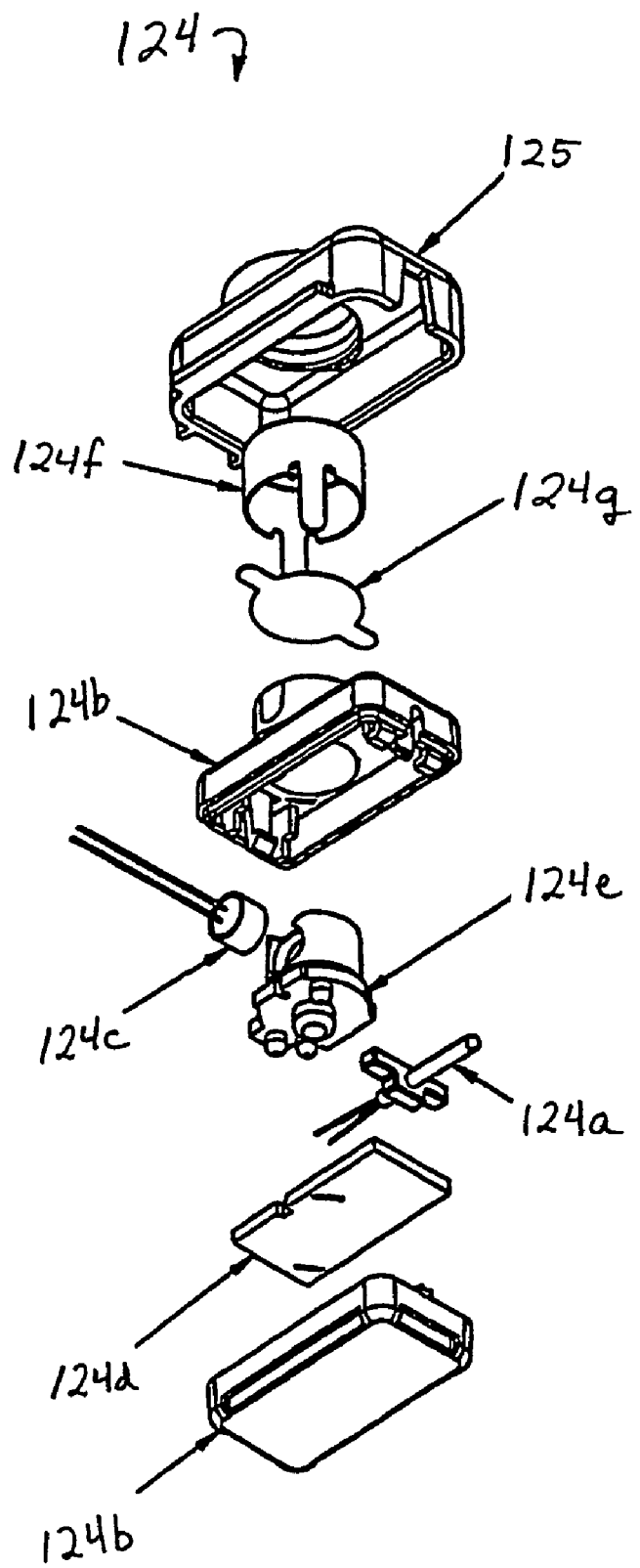
FIG. 16 is an exploded view of a microphone module useful with the microphone assembly of the present invention.

Microphone module 124 includes a housing portion 124b, which substantially encases an audio receiving portion or microphone sensing element 124c (or multiple microphone sensing elements, such as a microphone array), an electronic circuit board 124d, a rubber or plastic or elastomeric microphone boot or body 124e around sensing element 124c, and a wind screen 124f and weather barrier 124g, as best shown in FIG. 16. Microphone module 124 may utilize aspects of other microphones or modules, such as accessory modules of the types disclosed in commonly assigned U.S. Pat. Nos. 6,243, 003; 6,278,377; and 6,420,975, which are hereby incorporated herein by reference. Protruding portion 124h provides a plurality of holes or apertures at a cover or end 124i for receiving sound or audible signals therethrough. The microphone module 124 thus may form a small, unitary or stand alone microphone module which may be purchased separately by the mirror manufacturer and provided to or assembled in the mirror assembly by the mirror manufacturer, as discussed below.

Microphone module 124 may comprise a directional microphone, which provides selective pickup of audible signals. The microphone module thus may provide for an improved signal to noise ratio by receiving signals from a preferred direction and substantially ignoring or filtering or canceling out signals from other directions. Microphone module 124 may provide an acoustic porting system, whereby boot 124e may define a primary port or channel 124j positioned toward the reflective element of the mirror assembly and a secondary port or channel 124k positioned toward the mirror mount or windshield, as can be seen in FIG. 14. The ports or channels 124j, 124k are formed in the rubber or plastic boot 124e around the sensing element 124c, such that when boot 124e is pressed into housing 124b, the ports or channels 124j, 124k are substantially isolated or sealed from one another and connect between the outer end of the microphone module (at the cover 124i) and a respective port (not shown) at the sensing element 124c.

The boot 124e and microphone sensing element 124c are positioned within a protruding portion 124h of housing 124b, such that the microphone sensing element 124c may be positioned toward an outer surface of the mirror assembly when the microphone module 124 is assembled to the mirror assembly, as discussed below. Weather barrier 124g is positioned or pressed between cover 124i and boot 124e and functions to substantially preclude liquids and/or other contaminants from reaching the isolated ports 124j, 124k of microphone module 124. Preferably, weather barrier 124g comprises a hydrophobic material which is also substantially acoustically transparent, so as to not adversely affect the sound signals received by microphone module 124. Use of such hydrophobic materials have long been known and used in the microphone art. Alternately, the weather barrier may comprise a hydrophilic material, without affecting the scope of the present invention.

Accordingly, microphone module 124 may be operable to at least substantially negate or null or cancel sound signals originating from areas forward of the microphone module (on the side of the secondary port or channel 124k) in response to a time delay between receiving signals at the respective ports and via known circuitry and methods. For example, as sound waves originating from the cabin of the vehicle travel over mirror assembly 110 and toward and over microphone module 124, the sound signals will pressurize primary port 124j first and then secondary port 124k slightly after primary port 124j. However, if the sound signals are traveling the opposite direction (from the windshield of the vehicle), the sound signal will reach and pressurize the secondary port slightly before the primary port. The acoustic construction of microphone module 124 creates or provides at least a substantial null for signals originating at the windshield (which reach and pressurize the secondary port before the primary port), while receiving and recognizing and processing signals received from within the cabin of the vehicle, such as from a driver or passenger area within the cabin of the vehicle. The microphone circuitry may process and amplify the signals received (such as by noise canceling, filtering, or otherwise discriminating vocal signals indicative of a human voice from non-vocal signals, such as sound from HVAC blowers, turn signals, wind noise and the like) as is known in the microphone art, to provide an output indicative of the received signals. The microphone module 124 thus may receive sound signals or audible signals in a cardioid, super-cardioid or hyper-cardioid directional polar pattern of sound signals, whereby the microphone module substantially negates or cancels out signals coming from forward of the microphone module, such as from the windshield area of the vehicle.

Acoustic or diffuser cover 126 of microphone assembly 122 includes an outer casing or protective shell or cage 128 and an acoustic or diffusing member 130 positioned within shell 128 and between shell 128 and microphone module 124. Casing or shell 128 comprises a substantially rigid plastic or metallic structure over and around microphone module 124 and diffusing member 130 to protect diffusing member 130 from deformation or damage. Although shown as an outer structure or cage type structure around diffusing member 130, shell 128 may be integrally formed within diffusing member 130, without affecting the scope of the present invention.

Diffusing member 130 is positioned at least partially over and preferably at least substantially over cover 124i of microphone module 124 and functions to substantially diffuse turbulence which may occur around microphone module 124 (such as when the windshield defogger or defroster is activated), while allowing sound waves or audible signals to be received properly by the ports 124j, 124k, as discussed below. Diffusing member 130 comprises a porous diffusing material 130a, such as a low density foam material or a reticulated foam material or porous or low density fibers or fibrous material or the like, and a less porous air flow limiting material or skin or textile or fabric material 130b along the outer surface of diffusing material 130a, as shown in FIG. 14.

Due to air turbulence which typically occurs along and around the windshield of a vehicle (particularly when the windshield defogger or defroster is activated), it is desirable to avoid the local pressurization of the ports 124j, 124k, which may result in noise or other unwanted signals being received by the microphone. In order to accomplish this, the outer air flow limiting material or skin material or canopy 130b may be selected to be partially or substantially impervious to air flow, in order to limit the air flow which passes through skin material 130b to diffusing material 130a. For example, skin material 130b may comprise a woven, knit or non-woven textile or fabric which provides small or tight pores to limit air passage therethrough, such as, for example, a polyester material or a polyolefin material, such as a polypropylene material or the like, or a rip-stop nylon material or the like. The selected textile or fabric may include hydrophobic fibers (which may be processed or treated or conditioned to have or may inherently have hydrophobic characteristics), such as polypropylene fibers or the like, to provide moisture protection to the diffusing material 130a and microphone module 124.

Diffusing material 130a is positioned between the air flow limiting material or skin material or textile canopy 130b and the microphone module 124 and functions to diffuse or reduce the air flow velocity of air that penetrates skin material 130b. Diffusing material 130a may comprise a highly porous foam material or the like which diffuses air flow therethrough, but which has a low acoustic resistivity so as to not substantially adversely affect the acoustic signals being received by the microphone module 124. The diffusing material 130a also functions to create a space between the microphone module 124 and skin material 130b to create a buffer zone so that skin material 130b and the pressure affects of the turbulent air flow are maintained away from the ports 124j, 124k of microphone module 124. Diffusing material 130a also diffuses any air flow which does pass through or penetrate skin material 130b, such that the air flow is less turbulent or violent by the time it reaches the inlet ports 124j, 124k of microphone module 124.

Accordingly, skin material or canopy 130b substantially reduces or limits the air flow which may be received by the ports 124j, 124k of microphone module 124, while diffusing material 130a diffuses the air flow that does penetrate skin material 130b. Also, because skin material 130b substantially reduces the air flow around the microphone module, the skin material facilitates implementation of a small-sized diffusing material pad, thereby reducing the overall size of the diffusing member 130 and shell 128 to improve the appearance of the acoustic cover 126 at mirror assembly 110. The particular materials for the skin material and the diffusing material may be selected to provide the desired acoustic affect at or around the microphone module.

Although diffusing material 130a is selected to minimize its effect on the acoustic signals traveling through the diffuser 130, some audible signals may be disrupted as they travel through diffuser 130. Such disruption may result in some signals (such as traveling from the driver or passenger area of the vehicle) reaching and pressurizing the primary and secondary ports out of sequence or at substantially the same time. In such situations, the microphone may not recognize the signal as originating from the desired area of the cabin of the vehicle, and may thus filter out or ignore such signals. In order to enhance the directional capability of microphone module 124, microphone assembly or system 122 may include an acoustic barrier or rib or structural divider or dividing member 132 across the outer cover 124i of microphone module 124 and between the inlets to the ports 124j, 124k, as best seen with reference to FIGS. 13 and 14.

As shown in FIG. 13, acoustic barrier or rib 132 may extend transverse or across and between the ports 124j, 124k of microphone module 124 and generally parallel to reflective element 118 of mirror assembly 110. Diffusing material 130a may comprise two separate sections, with one section or portion at each side of rib 132, or may comprise a single piece of diffusing material with a slit or gap formed therein for receiving rib 132, in order to limit compression of diffusing material 130a by rib 132, which may affect the porosity and functionality of diffusing material 130a around rib 132. In the illustrated embodiment, rib 132 comprises a plastic rib extending across and above the microphone embodiment, such as part of the mirror casing 116 or part of the microphone assembly or diffuser cover. However, rib 132 may comprise other material and may be otherwise positioned across the outer cover of microphone module 124, without affecting the scope of the present invention.

Acoustic barrier or rib 132 may comprise a material having a high acoustic resistivity so that the sound wave propagating through diffusing material 130a does not travel through rib 132 and, thus, may have to travel around or over rib 132 to get from one side of rib 132 to the other. The acoustic barrier or rib 132 thus creates a longer path for the sound waves to travel, such that sound waves traveling through the diffusing material and generally toward the windshield of the vehicle will be delayed in reaching the secondary port, whereby the microphone may recognize the signal as originating from within the cabin or desired area of the vehicle. The acoustic barrier or rib 132 also delays sound waves traveling in the opposite direction in a similar manner.

Because diffusing material 130a functions to diffuse the air flow and may correspondingly disrupt some of the sound waves or audible signals, the disrupted sound waves may end up pressurizing both ports 124j, 124k at approximately or substantially the same time or out of sequence, such that the directivity of microphone module 124 may be adversely affected or reduced. Accordingly, acoustic barrier or rib 132 may be provided to delay the sound waves traveling from the desired area (the cabin of the vehicle and rearward of the mirror assembly) through the diffusing material 130a. The sound waves traveling through diffusing material 130a thus pressurize the primary port 124j first and then may travel around rib 132 before arriving at and pressurizing the secondary port or ports 124k of microphone module 124, while sound waves traveling in the opposite direction (from the windshield) will arrive at and pressurize the secondary port or ports 124k before arriving at and pressurizing the primary port 124j. The acoustic barrier or rib 132 thus may enhance the directivity of microphone module 124 by effectively extending the port distance of the microphone module to the outer or upper end of rib 132, whereby sound waves traveling through the diffusing material influence the ports of the microphone module at different times and in the proper sequence.

Optionally, the acoustic or diffuser cover of the present invention may comprise a heat formed polyolefin material, such as a polypropylene material or the like, which is formed into a desired shape. The formed acoustic or diffuser cover may then be positioned within a correspondingly formed protective shell or case or cage or the like as discussed above. Alternately, the formed diffuser cover may comprise a structural formed cover, and may include stiffening or strengthening structural members integrated therein, such that the formed diffuser may not include the protective cover.

Microphone module 124 may be positioned at least partially within the mirror assembly 110, such as described above with respect to mirror assembly 10, or by lowering or placing the microphone module 124 within a pocket or cutout region formed in the casing and/or between the casing 116 and bezel 120 of mirror assembly 110, without affecting the scope of the present invention. The microphone module 124 may be received within a flexible rubber grommet 125, which substantially encases the housing portion 124b of microphone module 124 and functions to flexibly engage the walls of a mounting pocket 123 within mirror assembly 110, such as part of the bezel assembly 120 or the casing 116, to snugly secure microphone module 124 within the pocket when placed therein and to reduce vibration of the microphone. The outer end or cover 124i of protruding portion 124h of microphone module 124 may extend toward or partially through an opening in the casing, such that the outermost portion or cover 124i of the microphone module 124 is generally flush at the upper portion of the casing 116 of mirror assembly 110, as can be seen in FIG. 13. The acoustic barrier or rib 132 may be formed as part of the mirror casing 116 or may be formed as part of the acoustic or diffuser cover 126 or microphone module 124, without affecting the scope of the present invention. Diffuser cover 126 may be snapped or otherwise secured or adhered over microphone module 124 at the upper portion of mirror assembly 110.

Optionally, and with reference to FIGS. 17-20, the microphone assembly 122' may be pre-assembled and mounted at or partially in the interior rearview mirror assembly 110', whereby the microphone assembly 122' is substantially secured at the upper region of mirror assembly 110'. The microphone module 124', acoustic barrier 132' and acoustic or diffuser cover 126' may be positioned as a pre assembled unit partially below the casing 116' and bezel 120' and/or within a pocket 123' to retain the microphone module 124' and diffuser cover 126' at the mirror assembly 110'. Pocket 123' may be formed or defined by a partial pocket 123a' defined by a platform or portion of the attachment plate or mounting plate 121 at the rear of the reflective element assembly 118 and an upper retaining portion or pocket portion 120a' of bezel portion 120' that may retain the microphone in place or within the partial pocket 123a' at the bezel portion 120', as described below. A printed circuit board 121a or the like may be attached to or mounted to the attachment plate 121.

Figure 17:
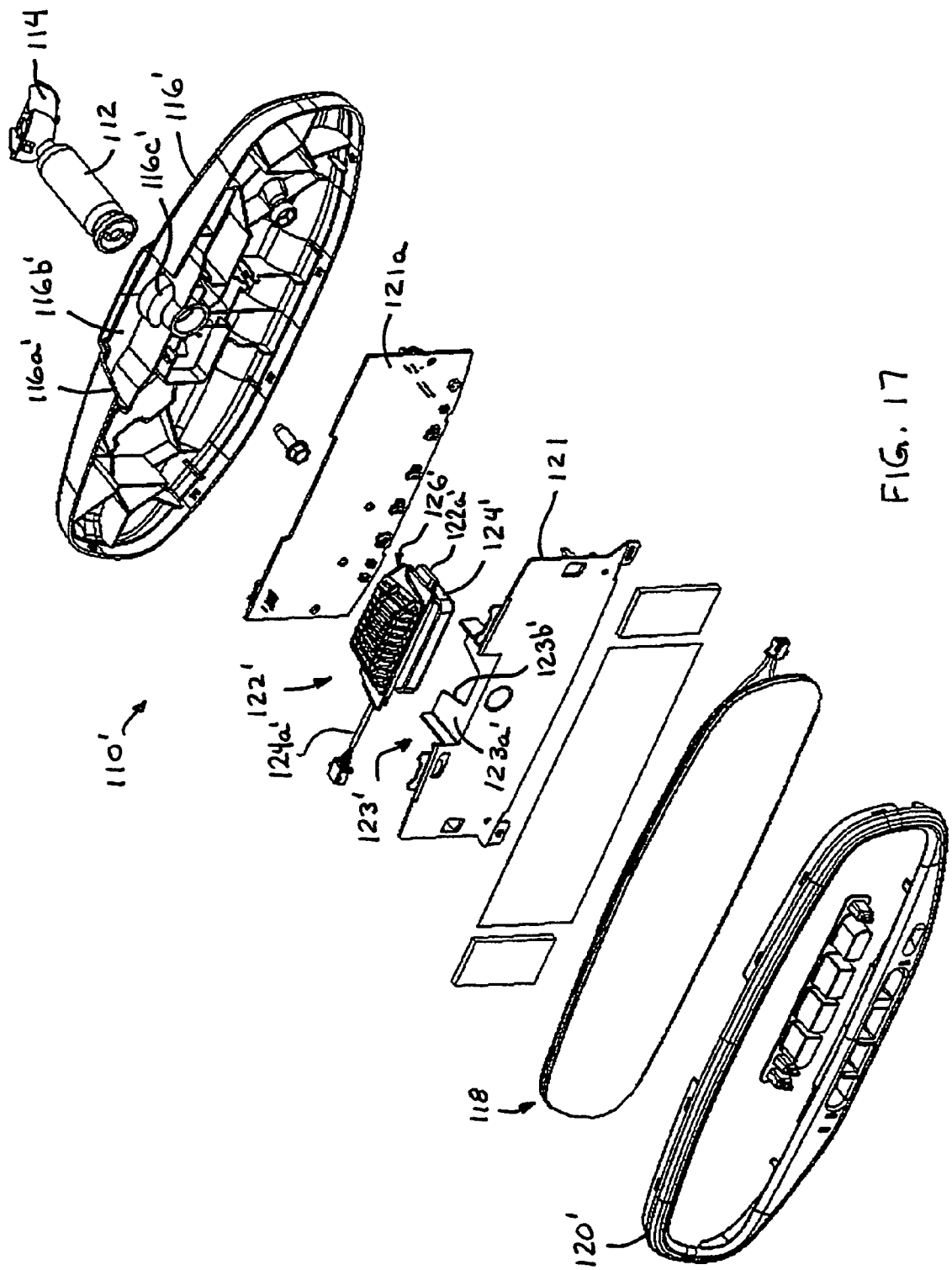
FIG. 17 is an exploded view of another interior rearview mirror assembly in accordance with the present invention.

As best shown in FIG. 17, microphone assembly 122' may include the microphone module 124' and the acoustic cover 126', which may be pre-assembled as a unit and which may include a lead or wire 124a' extending therefrom for electrically connecting the microphone to the circuit board when the microphone assembly is positioned at the pocket of the mirror assembly. Microphone module 124' and acoustic cover 126' (which may include the outer air flow limiting material or skin or textile layer 130' and/or the diffuser material within an outer structure or cage as described above, and which may include an inner air flow limiting material or skin or textile layer, such as described below with respect to FIGS. 21-26) may be assembled together.

Figure 19:
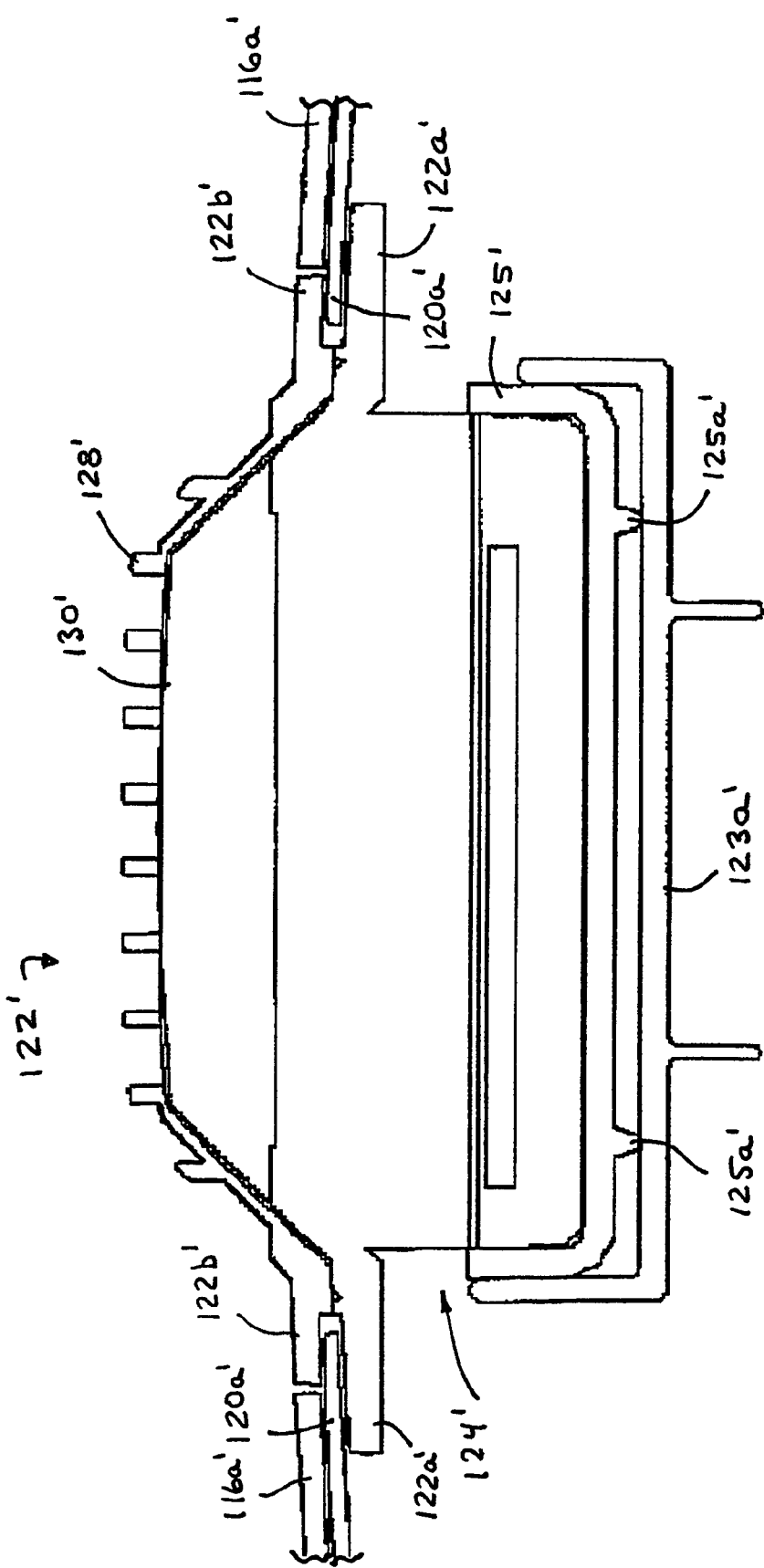
FIG. 19 is a forward sectional view of the interior rearview mirror assembly of FIGS. 17 and 18, taken generally through a forward portion of the microphone module.
Figure 20:
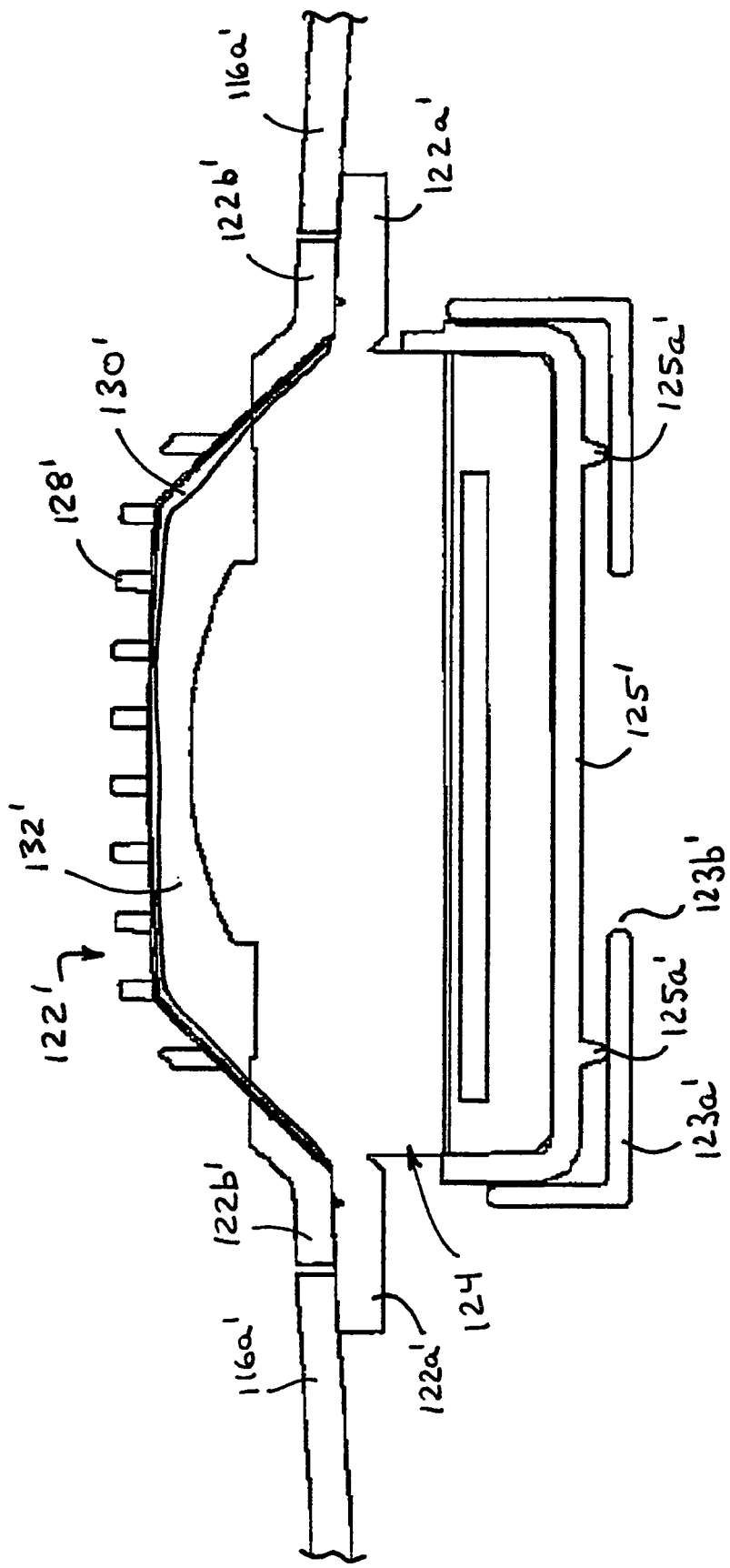
FIG. 20 is another forward sectional view of the interior rearview mirror assembly of FIGS. 17-19, taken generally through a rearward portion of the microphone module.

The microphone assembly 122' may include outwardly extending flaps or flanges 122a', 122b' extending from the sides of the microphone assembly 122' and defining a receiving portion or groove or slot therebetween. As shown in FIG. 19, lower flap 122a' may extend below a lip or flange or pocket portion 120a' of bezel portion 120', while upper flap 122b' of microphone assembly 122' may extend above lip 120a' of bezel portion 120' to trap or capture or retain microphone assembly in partial pocket 123a' when the reflective element assembly 118 and attachment plate 121' and circuit board 121a' are attached to or received in bezel portion 120'. As can also be seen in FIGS. 17 and 19, mirror casing 116' may define a pocket or recessed portion 116b' for receiving microphone assembly 122' therein when casing 116' is attached to bezel portion 120'. Recessed portion 116b' may be defined by an edge portion or flap or flange 116a' that may overlap bezel flange portion 120a' to further retain microphone assembly 122' in the pocket 123' when the casing and bezel portion are secured together. The flange 116a' may at least partially overlap flange 122a' along a rearward portion of microphone assembly 122' (as shown in FIG. 20) to retain the microphone assembly within the pocket 123' rearward from the bezel 120'. As can be seen in FIGS. 17 and 20, partial pocket or platform 123a' of attachment plate 121 may include a notch or cutaway 123b' around the rear of the platform to accommodate a mounting arm receiving portion 116c' of casing 116' when casing 116' is attached to bezel 120' with microphone assembly 122' secured therebetween.

Figure 18:
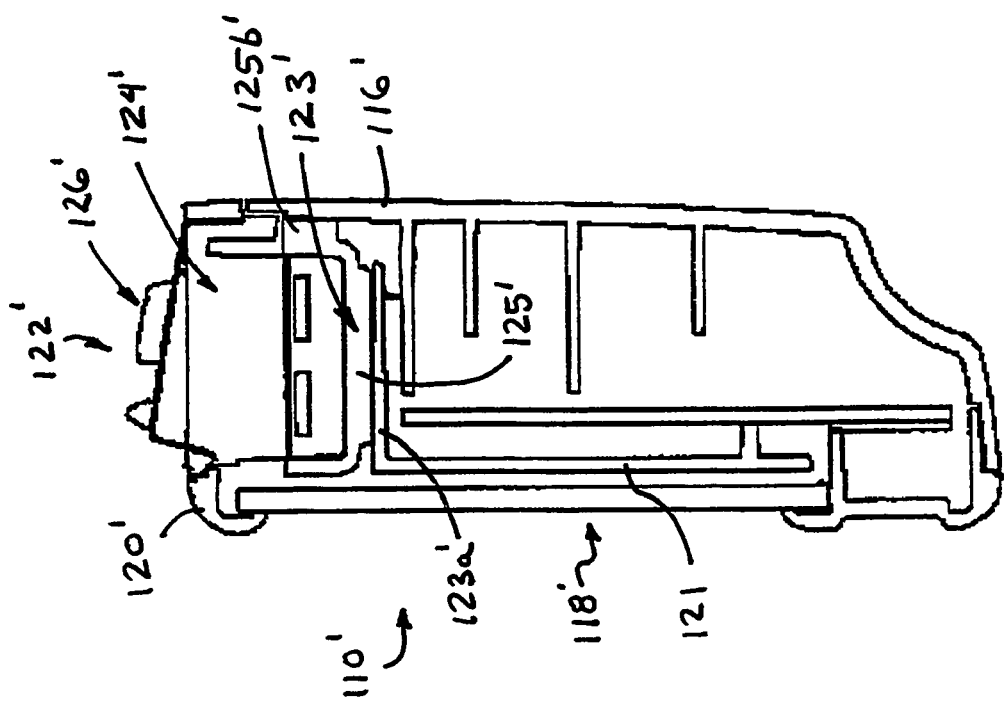
FIG. 18 is a sideward sectional view of the interior rearview mirror assembly of FIG. 17.

As can be seen with reference to FIGS. 18-20, microphone assembly 122' may include an elastomeric or rubber grommet 125', which may at least partially or substantially encase the housing portion or body 124b' of microphone module 124' and may function to flexibly engage the walls of the partial pocket 123a' and of the attachment plate 121 and of the mirror casing 116', to snugly secure microphone module 124' within the pocket when placed therein and to reduce vibration of the microphone. For example, a lower portion of grommet 125' may include one or more ribs 125a' (FIGS. 19 and 20) for flexibly and compressibly engaging platform 123a' of attachment plate 121, while a rear portion of the grommet 125' may include one or more ribs 125b' (FIG. 18) for flexibly and compressibly engaging the mirror casing 116' when the casing is pressed against microphone assembly 122' and bezel portion 120' to assemble the mirror assembly 110'.

Although shown and described as being positioned at an upper portion of the mirror assembly, the microphone system or assembly of the present invention may optionally be positioned elsewhere at the mirror casing, such as at an upper portion or eyebrow portion of the mirror casing, or a lower portion of the mirror casing, such as at a lower bezel or gondola portion of the mirror casing or assembly, or at one or both sides of the mirror casing (such as at the driver side of the mirror casing to direct the microphone to receive signals originating from the driver side of the vehicle cabin), depending on the particular application of the microphone system. It is further envisioned that the microphone system or assembly of the present invention may be positioned adjacent to an interior rearview mirror assembly, or may be included in an attachment to an interior rearview mirror assembly, or may be included in a module associated with an interior rearview mirror assembly, or may be included in a windshield electronic module or the like, without affecting the scope of the present invention. It is further envisioned that the benefits of the present invention may be achieved for a microphone, microphones or a microphone array or microphone system or the like located elsewhere in the vehicle, such as at a header portion of the vehicle or at a header console or the like, without affecting the scope of the present invention.

Figure 15:
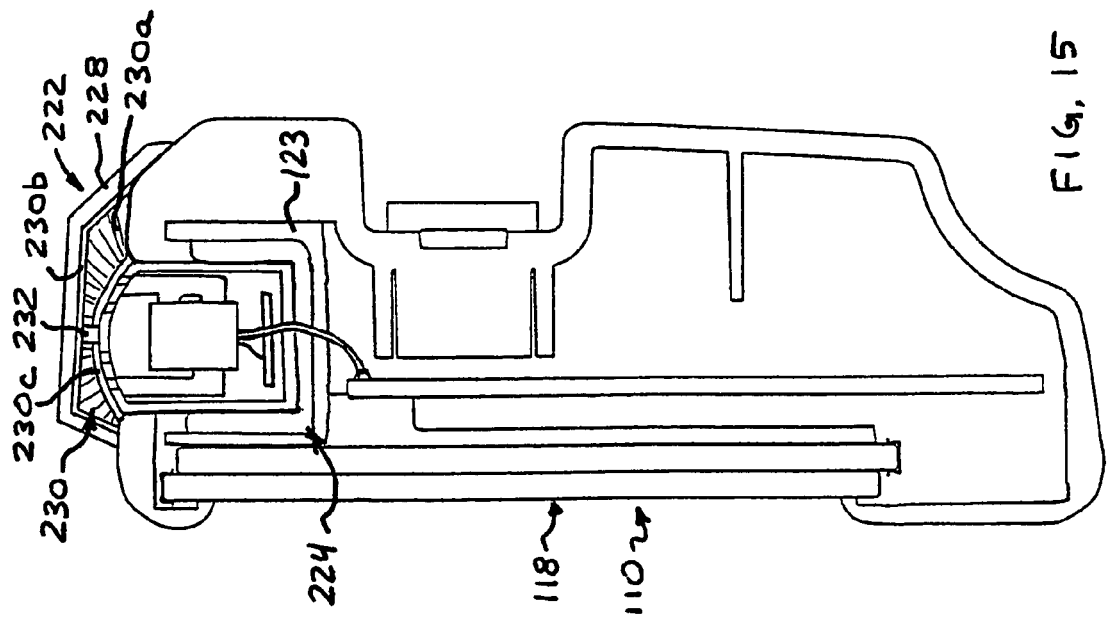
FIG. 15 is another sectional view similar to FIG. 14, but of another embodiment of a microphone assembly in accordance with the present invention.

Referring now to FIG. 15, a microphone system 222 may comprise a microphone module 224 positioned at or partially within interior rearview mirror assembly 110 and an acoustic or diffuser cover assembly 226 positioned over and substantially around microphone module 224. Microphone module 224 is substantially similar to microphone module 124, discussed above, such that a detailed discussion of the microphone module will not be repeated herein. Cover assembly 226 may include an outer casing or shell 228 positioned at least partially over and preferably substantially over and substantially around an acoustic and/or diffusing member or layer or layers 230 in a similar manner as shell 128 is positioned over and around diffusing member 130, discussed above.

Diffusing member 230 comprises a structural cloth or engineered material which comprises a three dimensional woven textile. For example, diffusing member 230 may comprise a tightly woven top surface or air flow limiting layer or skin layer or textile canopy 230b woven or bonded or adhered to a highly porous diffusing layer 230a, such as a micro-fiber foam or other foam type material, which may, in turn, be woven or bonded or adhered to an inner skin layer or air flow limiting layer or textile cover 230c, which may be a thin, porous and substantially acoustically transparent material to minimize its effect on the microphone system. Such three dimensional woven textiles are commercially available, such as a form of 3Mesh® available from Muller Textil of Woonsocket, R.I. The outer or top layer 230b thus may function in a similar manner as skin material 130b, discussed above, while the diffusing layer 230a and inner layer 230c may function in a similar manner as diffusing material 130a, discussed above. A slit or gap may be provided across diffusing layer 230a and inner layer 230c for receiving an acoustic barrier or rib or dividing member 232, in a similar manner as discussed above. Other acoustic and/or diffusing and/or air flow limiting materials or layers may be implemented, depending on the particular application and desired performance characteristics of the microphone system, without affecting the scope of the present invention.

For example, and with reference to FIGS. 21-26, various embodiments of microphone assemblies with various covers and acoustic barriers are shown. The covers include a rigid plastic or polymeric cover or protective vented cover or cage or the like and an outer air flow limiting layer or textile layer or skin material or canopy generally at or along the rigid cover and positioned at least partially over and spaced from the microphone ports. A second or inner air flow limiting layer or textile layer or skin material (or two pieces of such a textile layer or skin material) may be positioned generally at or at least partially over the entrance to the ports of the directional microphone. The outer air flow limiting canopy (at the protective cover or cage) and the inner air flow limiting layer (at the entrance to the ports of the microphone) may be spaced apart to provide a space or medium therebetween for the travel or propagation of the air flow and sound waves that pass through the outer layer or canopy. The space or medium may comprise air (where the outer skin and inner skin layers are separated with an air pocket defined therebetween) or may comprise a diffusing material, such as described above with respect to diffuser layers 130a, 230a, without affecting the scope of the present invention.

As described above, the air flow limiting layers may comprise a textile or fabric (such as a non-woven textile or a knit textile or a woven textile) which provides small or tight pores to limit air passage therethrough and to provide a desired acoustic resistance and air permeability resistance. The air flow limiting skin or textile material may be selected to provide a desired acoustic resistance and physical resistance to air flow or permeability at the microphone. The air flow limiting material may comprise, for example, a non-woven textile, such as a polyester material, such as a spun bond, point bonded polyester material or the like, or a carded polyester material or the like, or a polyolefin material, such as a polypropylene material or the like, or a rip-stop nylon material or the like, or other materials, such as a two dimensional cloth like material, such as a thin felt type material that has no orientation of the fibers, or other similar or suitable materials or the like. Optionally, the air flow limiting material may comprise a woven or knit textile or the like, without affecting the scope of the present invention. The material selection may be driven by the desired acoustic resistance and physical resistance to air permeability for the particular application of the microphone assembly or system.

The selected textile or fabric or material for at least the outer skin or air flow limiting layer or canopy may include hydrophobic fibers (which may be processed or treated or conditioned to have hydrophobic characteristics or which may inherently have hydrophobic characteristics), such as polyolefin fibers, such as polypropylene fibers or the like, to provide moisture protection to the skin material and to the microphone module. Optionally, the outer skin layer may comprise a UV stabilized/stable material, such as a polyester material or the like, for enhanced UV tolerance, while the inner skin layer or layers may comprise a less UV stabilized/stable material (and potentially a less expensive material), such as a polyolefin material, such as a polypropylene material or the like, since the inner skin layer will be substantially shielded from UV radiation via the outer skin layer or canopy.

The inner skin layer or layers may comprise the same textile or fabric material at both ports (and may be a single piece or skin layer that extends over both ports of the microphone), or the inner skin layers or portions may comprise different textile or fabric materials for each port. For example, a textile or fabric material or the like having certain desired acoustic resistance and air permeability resistance properties may be selected for the primary port, while a different textile or fabric material or the like having other characteristics or properties may be selected for the secondary port. The different materials may allow the acoustic resistance and air permeability resistance to be engineered or adjusted at each port to provide a desired performance or characteristic of the microphone assembly or system.

Figure 21:
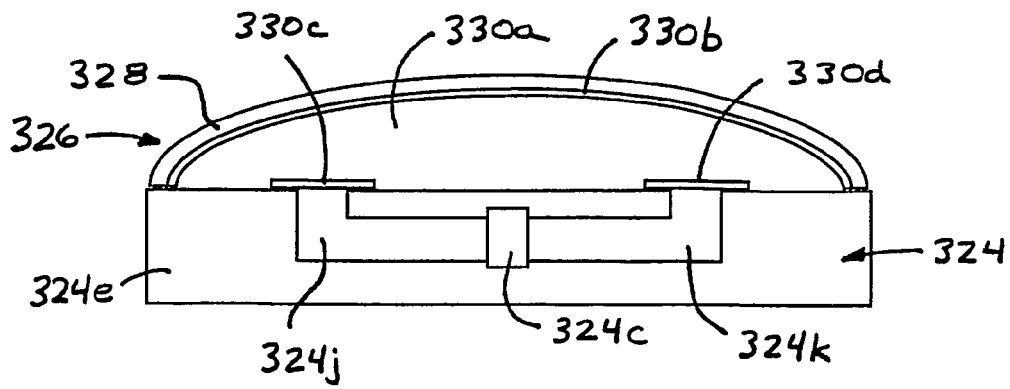
FIGS. 21-26 are sectional views of various microphone assemblies in accordance with the present invention.

With reference now to FIG. 21, the microphone assembly 324 may include a microphone element 324c and a front port 324j and rear port 324k within the microphone boot or body 324e. The cover 326 includes a rigid plastic cover or cage portion 328, which may have an outer air flow limiting skin or textile layer or material or canopy 330b along an inner surface of the cage portion 328. Each of the ports 324j, 324k may have an inner air flow limiting skin or textile layer or material 330c, 330d disposed at the entrance to the front and rear ports, respectively. The inner air flow limiting layer may be positioned outside of the vented cover (such as cover 124i discussed above) or inside the cover at the entrance to the ports, without affecting the scope of the present invention.

The outer air flow limiting layer 330b and inner air flow limiting layer or layers 330c, 330d may be spaced apart to define an intermediate space or medium or layer 330a therebetween. The intermediate layer 330a may comprise an air pocket between the outer air flow limiting layer 330b and the microphone body 324b and inner layers 330c, 330d, or may comprise a diffusing material, such as a foam material or woven or non-woven fibrous material or the like, such as described above with respect to diffusing layers 130a, 230a. Optionally, and as described above, the layers 330b, 330a and 330c, 330d may define a three dimensional textile that has a tightly woven outer surface or air flow limiting layer that is woven or bonded or adhered to a highly porous intermediate diffusing layer, such as a micro-fiber foam or other foam type material, which is in turn woven or bonded or adhered to an inner air flow limiting layer, without affecting the scope of the present invention.

Figure 22:
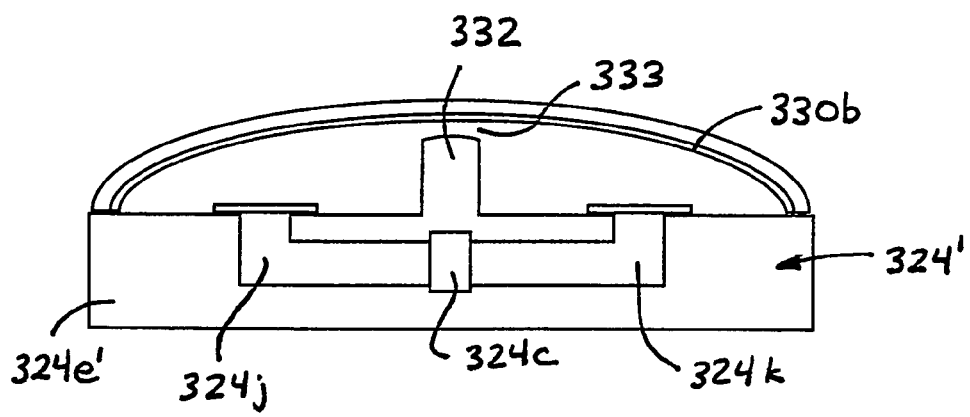
Figure 23:
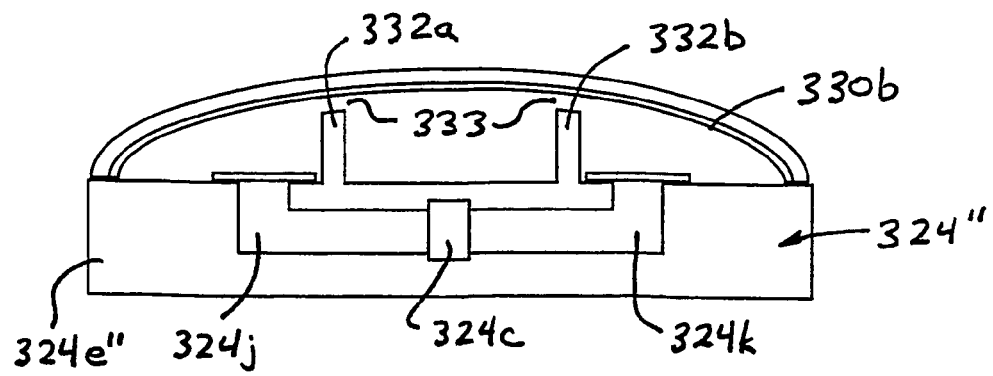
Figure 24:
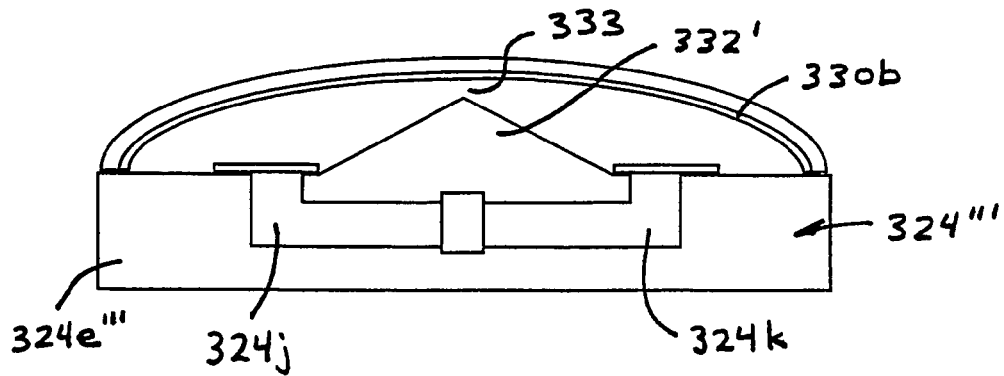

Optionally, and as shown in FIG. 22, the microphone assembly 324' may include an acoustic barrier or rib 332 that extends along the microphone body 324e' and between the entrances to the ports 324j, 324k, such as described above with respect to acoustic barrier or ribs 132, 232. Optionally, and as shown in FIG. 23, the microphone assembly 324" may include a pair of acoustic barriers or ribs 332a, 332b that extend along the microphone body 324e" and between the ports 324j, 324k and near or adjacent to a respective one of the ports. Optionally, and as shown in FIG. 24, the microphone assembly 324''' may include a ramped or sloped or wedge-shaped acoustic barrier or rib 332' that extends along the microphone body 324e''' and between the entrances to the ports 324j, 324k. Other forms or shapes of acoustic barriers or ribs may be implemented without affecting the scope of the present invention.

In each illustrated application, the acoustic barrier defines at least one gap 333 between the upper end or distal end of the acoustic barrier and the lower or inner surface of the outer air flow limiting layer 330b. The gap 333 provides a passageway for air flow to allow quick pressure balancing between the ports when air flows in at one side of the microphone assembly. The acoustic barrier thus separates the ports and provides a leakage path or a low resistance relief valve between the ports. In an exemplary embodiment, the gap may be approximately one millimeter between the canopy and the acoustic barrier, but other dimensions may be selected depending on the particular application, without affecting the scope of the present invention.

Figure 25:
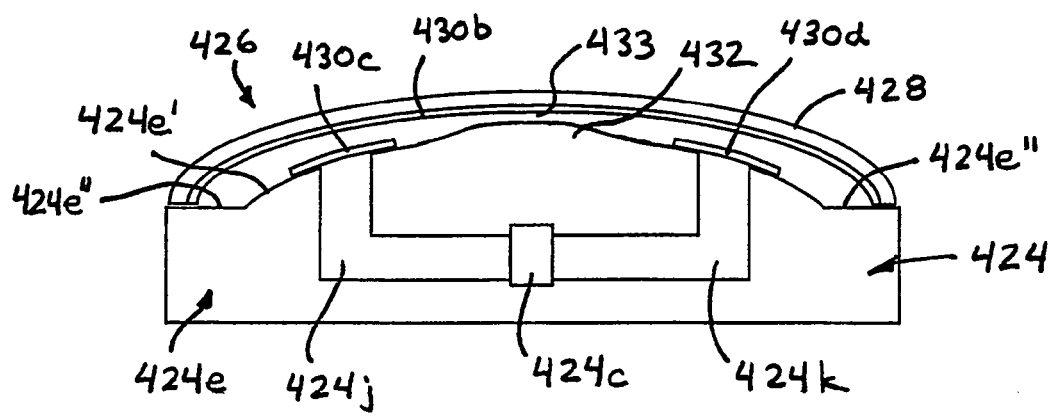

Optionally, and with reference to FIG. 25, the microphone assembly 424 may include a microphone body 424e that has a curved outer surface 424e'. The microphone assembly 424 may include an electronic microphone element 424c and a front port 424j and a rear port 424k extending between respective portions of microphone element 424c and the outer curved surface 424b' of microphone body 424b. Microphone assembly 424 includes a cover 426, which may include an outer rigid plastic cover portion 428 or the like and an outer air flow limiting skin or textile layer or material or canopy 420b at the cover portion 428. An inner air flow limiting skin or layer portion or portions 430c, 430d may be provided at the entrances to the ports 424j, 424k in a similar manner as described above.

The entrances to the ports 424j, 424k may be at the sloped or curved outer surface 424e'. In such an application, it is envisioned that any moisture that may pass through the outer skin layer 430b may accumulate or collect at the outer portion or region 424e" of microphone body 424e and thus may be collected and kept away from the microphone ports 424j, 424k, such that the moisture may not enter the ports and thus may not adversely affect the performance of the microphone. Optionally, the outer surface of the microphone body may be substantially flat (such as shown in FIGS. 21-24), but one or more recesses or channels or pockets or wells may be formed away from the ports to collect moisture or condensation at a location remote from the parts, without affecting the scope of the present invention. Optionally, the curved outer surface 424e' may be curved to form or define a raised acoustic barrier or rib 432 that extends between the ports 424j, 424k and along the curved surface 424e' of microphone body 424e. The acoustic barrier or rib 432 may define a gap 433 between an outer or distal end of the rib and the inner surface of the outer skin or textile layer 430b in a similar manner as described above.

Figure 26:
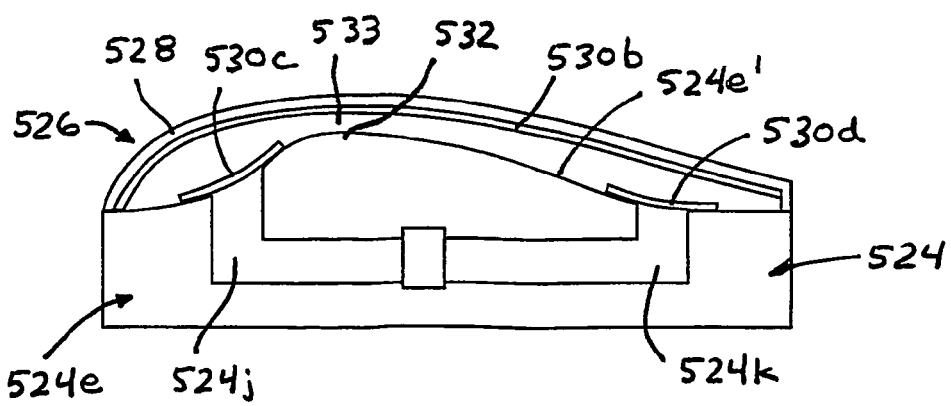

Optionally, and with reference to FIG. 26, the microphone assembly 524 may be formed to correspond with the general shape of the portion of the mirror assembly or accessory module to which the microphone assembly is to be attached. For example, the microphone assembly 524 may include a microphone body 524e that has a curved outer surface 524e' that may be non-symmetrical or non-spherical, such as with a portion (at the primary port 524j) being raised relative to the other portion (at the secondary port 524k). The acoustic cover 526 may include a rigid protective cover portion 528 and an outer air flow limiting skin or textile layer 530b that may be generally correspondingly formed or contoured to provide the desired shape or appearance to the microphone assembly. Optionally, the cover portion 528 may be aerodynamically formed or shaped and may have reduced and rounded edges to reduce or minimize sharp edges that may cause turbulent air around the microphone and that may thus adversely affect the performance of the microphone. The inner air flow limiting skin layers or portions 530c, 530d may be disposed at the respective ports 524j, 524k, and the outer curved surface 524e' of microphone body 524e may be formed to define a raised acoustic barrier or rib 532 between the skin portions 530c, 530d and ports 524j, 524k. As discussed above, the rib 532 may define a gap 533 between the upper end of the rib and the lower surface of the outer skin or textile layer 530b of cover 526.

The microphone assembly or system of the present invention thus provides an outer air flow limiting skin or textile or fabric layer or material or canopy that is spaced from the ports of the microphone to substantially reduce or limit the air flow that may be received by the ports. The microphone may include a second air flow limiting skin or textile or fabric layer that is disposed at the entrances to the ports and that is spaced from the outer layer or canopy. The space defined between the air flow limiting layers may comprise an air pocket or may comprise a diffusing material, such as a porous material or the like. The microphone assembly may include an acoustic barrier between the microphone ports and spaced from the outer layer or canopy to enhance the directivity and performance of the microphone.

Therefore, the present invention provides a microphone assembly or system which functions to substantially diffuse turbulent air flow around the microphone while providing for a directional microphone system. The air flow limiting skin material limits the affects of turbulence by creating a buffer zone and maintaining the pressure affects out away from the microphone, while the diffusing material diffuses the air flow that does penetrate the skin material. The air flow limiting material thus substantially reduces the turbulence affects while minimizing the size of the diffusing member, in order to enhance the aesthetic quality of the microphone assembly or system. An acoustic barrier or rib or dividing member may delay the disrupted sound waves traveling along and through the diffusing material so as to have the waves influence the primary and secondary ports of the microphone at different times, thereby enhancing the directivity of the microphone. The present invention thus substantially physically isolates one side or port of the microphone from the other via a mechanical baffle or acoustic barrier or wall between the fore and aft ports of the microphone. The microphone system or assembly of the present invention thus accepts and substantially diffuses turbulent air around the microphone and provides improved wind performance when the source of the wind is not from the windshield area or back of the mirror (such as when the windows of the vehicle are open), while avoiding any unsightly deflectors and the like of the prior art.

The microphone module of the present invention may electrically connect to a printed circuit board (PCB) attached to a mounting plate of the reflective element of the interior rearview mirror assembly. An example of such a mounting plate and circuit board arrangement is disclosed in commonly assigned U.S. Pat. No. 5,820,245, which is incorporated in its entirety by reference herein. The printed circuit board may snap, clip or otherwise attach or fasten to the plastic mounting plate (such as via one or more plastic, flexible tabs or hooks or retainers extending from the mounting plate). Preferably, the circuit board is spaced or offset from the mounting plate via spacers or the like, to allow space for components or circuitry on either side of the circuit board. Alternately, the circuit board may be independently supported from the reflective element or in the casing, without affecting the scope of the present invention. Reference is made to U.S. Pat. Nos. 5,671, 996 and 5,820,245, and to U.S. provisional application Ser. No. 60/500,858, filed Sep. 5, 2003 by Kulas et al. for INTERIOR REARVIEW MIRROR ASSEMBLY; and Ser. No. 60/471,546, filed May 19, 2003 by Uken et al. for MIRROR ASSEMBLY FOR VEHICLE, the disclosures of which are hereby incorporated herein by reference in their entireties.

The circuit board may support, for example, light emitting diodes (LEDs) (such as light sources 134 of mirror assembly 110 in FIG. 13) for providing illumination or indicators or for illuminating indicia on display elements provided on the chin 120a of the bezel 120 of the mirror assembly or display devices provided on the reflective element, or map or dash board lights or the like. The circuit board may also or otherwise support, for example, user interface buttons or actuators 136 at the chin 120a or elsewhere on mirror assembly 110 for providing control input to the circuit board from a driver or passenger within the cabin of the vehicle. The circuit board may also include a connector or plug or socket for connecting to a wiring feed (not shown) from the vehicle wiring to provide power to and communication to and from the mirror assembly.

Optionally, the reflective element may comprise an electro-optic or variable reflectance reflective element assembly or cell, which includes an electrochromic medium disposed therein. The electrochromic medium changes color or darkens in response to electricity or voltage applied to or through the conductive layers at either side of the electrochromic medium. The electrochromic medium may be a solid polymer matrix electrochromic medium, such as is disclosed in U.S. Pat. No. 6,154,306, which is hereby incorporated by reference herein, or other suitable medium, such as a liquid or solid medium or thin film or the like, such as the types disclosed in U.S. patent application Ser. No. 09/793,002, entitled VIDEO MIRROR SYSTEMS INCORPORATING AN ACCESSORY MODULE, filed Feb. 26, 2001, now U.S. Pat. No. 6,690,268, and in U.S. Pat. Nos. 5,668,663 and 5,724,187, the entire disclosures of which are hereby incorporated by reference herein, without affecting the scope of the present invention. The electrochromic element may utilize the principles disclosed in commonly assigned U.S. Pat. Nos. 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 or 4,712,879, which are hereby incorporated herein by reference, or as disclosed in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenies: Materials and Devices for Transmittance Control*, C. M. Lampert and C. G. Granquist, EDS., Optical Engineering Press, Wash. (1990), which are hereby incorporated by reference herein, and in U.S. patent application Ser. No. 09/792,002, filed Feb. 26, 2001 by Schofield et al. for VIDEO MIRROR SYSTEMS INCORPORATING AN ACCESSORY MODULE, now U.S. Pat. No. 6,690,268, which is hereby incorporated herein by reference.

The printed circuit board may include electronic or electrical circuitry for actuating the variable reflectance of the reflective element and for operating other electrical or electronic functions supported in the rearview mirror assembly. The printed circuit board optionally may include glare sensing and ambient photo sensors and electrochromic circuitry that automatically dims the reflectivity of the electrochromic mirror element when glare conditions are detected, such as at nighttime or the like.

Although shown and described as being an electro-optic or electrochromic reflective element, the reflective element of the interior rearview mirror assembly may otherwise comprise a prismatic reflective element, without affecting the scope of the present invention.

The interior rearview minor assembly may also include or house a plurality of electrical or electronic devices, such as antennas, including global positioning system (GPS) or cellular phone antennas, such as disclosed in U.S. Pat. No. 5,971,552, a communication module, such as disclosed in U.S. Pat. No. 5,798,688, displays, such as shown in U.S. Pat. Nos. 5,530,240 and 6,329,925, blind spot detection systems, such as disclosed in U.S. Pat. Nos. 5,929,786 or 5,786,772, transmitters and/or receivers, such as garage door openers, a digital network, such as described in U.S. Pat. No. 5,798,575, a high/low head lamp controller, such as disclosed in U.S. Pat. No. 5,715,093, a memory minor system, such as disclosed in U.S. Pat. No. 5,796,176, a hands-free phone attachment, a video device for internal cabin surveillance and/or video telephone function, such as disclosed in U.S. Pat. Nos. 5,760,962 and 5,877,897, a remote keyless entry receiver, map lights, such as disclosed in U.S. Pat. Nos. 5,938,321; 5,813,745; 5,820,245; 5,673,994; 5,649,756; or 5,178,448, microphones, such as disclosed in U.S. Pat. Nos. 6,243,003; 6,278,377 and 6,420,975, speakers, a compass, such as disclosed in U.S. Pat. No. 5,924,212, and/or U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, a seat occupancy detector, a trip computer, an ONSTAR® system or the like (with all of the above-referenced patents and applications commonly assigned to Donnelly Corporation, and with the disclosures of all of the referenced patents and applications being hereby incorporated herein by reference in their entireties).

Although shown and described above as being positioned on, at or partially within an interior rearview mirror assembly of the vehicle, the microphone system of the present invention optionally or alternately may be positioned on, at or partially within a windshield electronic module or windshield integration module or accessory module or attachment or the like positioned at or near the interior rearview mirror assembly or the windshield of the vehicle. The windshield electronic module or attachment may include other accessories or components and may utilize aspects of accessory modules such as of the types disclosed in commonly assigned U.S. Pat. Nos. 6,243,003; 6,278,377; 6,420,975; U.S. patent application Ser. No. 09/792,002, filed Feb. 26, 2001 by Schofield et al. for VIDEO MIRROR SYSTEMS INCORPORATING AN ACCESSORY MODULE, now U.S. Pat. No. 6,690,268; and Ser. No. 10/054,633, filed Jan. 22, 2002 by Lynam et al. for VEHICULAR LIGHTING SYSTEM, now U.S. Pat. No. 7,195,381; International Publication No. WO 01/64481, published Sep. 7, 2001; and/or U.S. patent application Ser. No. 10/355,454, filed Jan. 31, 2002 by Schofield et al. for VEHICLE ACCESSORY MODULE, now U.S. Pat. No. 6,824,281, which are all hereby incorporated herein by reference.

The windshield electronic module/accessory module may be positioned at or adjacent to the windshield of the vehicle such that at least a portion of the windshield module is positioned at the windshield. The windshield electronic module may attach to the windshield, and may have a view toward the windshield, or may be an extension of a header console or the like, such as a windshield module of the types disclosed in U.S. Pat. No. 6,445,287; and in U.S. patent application Ser. No. 10/232,122, filed Aug. 30, 2002 by Schofield et al. for TIRE INFLATION ASSISTANCE MONITORING SYSTEM, now U.S. Pat. No. 6,975,215, which are hereby incorporated herein by reference. Such windshield electronic modules may be separate and distinct from an interior rearview mirror assembly. Because the windshield electronic module attaches at the windshield area of the vehicle, such windshield electronic modules/accessory modules are also particularly subject to potential sound interference due to blowers, fans and/or the like.

Therefore, the present invention provides a microphone assembly for positioning on, at, adjacent to or within an interior rearview mirror assembly of a vehicle or on, at or within an accessory or microphone module or attachment which may be positioned at or adjacent to or in the vicinity of an interior rearview mirror assembly or windshield or header portion of a vehicle. The microphone assembly is operable to substantially resist air flow to the microphone and to diffuse turbulent air flow around the microphone while providing for a directional microphone system. The present invention provides an acoustic or diffusing member which includes an outer air flow limiting layer or canopy for limiting the affects of turbulent air flow around the microphone by creating a buffer zone and maintaining the pressure affects out away from the microphone. An inner air flow limiting material or layer may be provided at the inlet ports of the microphone and spaced from the outer layer or canopy. The present invention also provides a diffusing material between the outer canopy and the microphone ports or inner air flow limiting layer or layers for diffusing the air flow that does penetrate the outer air flow limiting material or canopy. The air flow limiting material or layer or layers thus substantially reduces the turbulence affects while minimizing the size of the diffusing member, in order to enhance the aesthetic quality of the microphone assembly or system.

The microphone system or assembly of the present invention also may provide an acoustic barrier or wall or rib which functions to delay sound waves traveling along and through the diffusing material so as to have the waves influence the primary and secondary ports of the directional microphone at different times and in the right sequence, thereby enhancing the directivity of the microphone. The present invention thus functions to substantially physically isolate one side of the microphone from the other via a mechanical baffle or acoustic barrier or wall between the fore and aft ports of the microphone. The microphone system or assembly of the present invention thus accepts and substantially diffuses turbulent air around the microphone and avoids any unsightly deflectors and the like of the prior art.

Changes and modifications in the specifically described embodiments can be carried out without departing from the principles of the present invention, which is intended to be limited only by the scope of the appended claims, as interpreted according to the principles of patent law.

The embodiments of the invention in which an exclusive property or privilege is claimed are defined as follows:

1. An interior rearview mirror assembly for a vehicle, said mirror assembly comprising:
   an accessory, wherein said accessory comprises a microphone module;
   a reflective element having a mounting plate at a rearward surface thereof, said mounting plate including a first portion of a pocket for at least partially receiving said accessory therein;
   a bezel, said bezel at least partially receiving said reflective element therein, said bezel including a second portion of said pocket, said first and second portions of said pocket at least partially receiving and securing said accessory therebetween when said reflective element is at least partially received in said bezel; and
   wherein said second portion comprises an accessory tab extending from said bezel and said first portion comprises a platform extending from said mounting plate, and wherein said accessory tab extends in overlapping relationship with said microphone module when said reflective element is at least partially received in said bezel.

2. The interior rearview mirror assembly of claim 1, wherein said accessory tab comprises an aperture therethrough for at least partially receiving an audio receiving portion of said microphone module such that said audio receiving portion extends at least partially though said aperture when said bezel, reflective element and microphone module are assembled together.

3. The interior rearview mirror assembly of claim 2, wherein said accessory tab comprises a flexible tab and flexes to overlap said microphone module, said accessory tab being biased to return toward its unflexed state when said audio receiving portion is at least partially received though said aperture.

4. The interior rearview mirror assembly of claim 3, wherein said microphone module includes flexible ridges, said accessory tab pressing against said flexible ridges to secure said microphone module between said accessory tab and said platform.

5. An interior rearview mirror assembly for a vehicle, said mirror assembly comprising:
   an accessory, wherein said accessory comprises a microphone module;
   a reflective element having a mounting plate at a rearward surface thereof, said mounting plate including a first portion of a pocket for at least partially receiving said accessory therein;
   a bezel, said bezel at least partially receiving said reflective element therein, said bezel including a second portion of said pocket, said first and second portions of said pocket at least partially receiving and securing said accessory therebetween when said reflective element is at least partially received in said bezel; and
   an acoustic cover positioned at least partially over at least one inlet port of said microphone module, wherein said acoustic cover comprises a diffusing material and an air flow limiting material positioned at least partially over said diffusing material, said air flow limiting material being configured to substantially limit air flow through said air flow limiting material, said diffusing material being configured to space and support said air flow limiting material from said at least one inlet port and to substantially diffuse air flow that penetrates said air flow limiting material.

6. An interior rearview mirror assembly for a vehicle, said mirror assembly comprising:
   an accessory, wherein said accessory comprises a microphone module;
   a reflective element having a mounting plate at a rearward surface thereof, said mounting plate including a first portion of a pocket for at least partially receiving said accessory therein;
   a bezel, said bezel at least partially receiving said reflective element therein, said bezel including a second portion of said pocket, said first and second portions of said pocket at least partially receiving and securing said accessory therebetween when said reflective element is at least partially received in said bezel; and
   an acoustic cover positioned at least partially over at least one inlet port of said microphone module, wherein said microphone module comprises a directional microphone having two inlet ports, said acoustic cover including an acoustic barrier positioned across said microphone and between said inlet ports, said acoustic barrier being configured to substantially acoustically isolate one of said inlet ports from the other of said inlet ports.

7. The interior rearview mirror assembly of claim 6, wherein said acoustic cover comprises an inner air flow limiting layer at least partially over said ports and an outer air flow limiting cover at least partially over and spaced from said inner air flow limiting cover, said air flow limiting covers being substantially resistant to air permeation.

8. An interior rearview mirror assembly for a vehicle, said mirror assembly comprising:
   an accessory;
   a reflective element having a mounting plate at a rearward surface thereof, said mounting plate including a first portion of a pocket for at least partially receiving said accessory therein; and
   a bezel, said bezel at least partially receiving said reflective element therein, said bezel including a second portion of said pocket, said first and second portions of said pocket at least partially receiving and securing said accessory therebetween when said reflective element is at least partially received in said bezel, wherein said second portion of said pocket comprises opposite flanges that engage corresponding grooves along opposite sides of said accessory to secure said accessory between said flanges and said first portion of said pocket.

9. The interior rearview mirror assembly of claim 8, wherein said accessory comprises a microphone module.

10. The interior rearview mirror assembly of claim 9, wherein said second portion comprises an accessory tab extending from said bezel and said first portion comprises a platform extending from said mounting plate.

11. The interior rearview mirror assembly of claim 9 including an acoustic cover positioned at least partially over at least one inlet port of said microphone module.

12. The interior rearview mirror assembly of claim 8, wherein said accessory includes flexible ridges, at least one of said first and second portions of said pocket engaging said flexible ridges to secure said accessory between said first and second portions.

13. The interior rearview mirror assembly of claim 8 including a printed circuit board mounted to said mounting plate.

14. The interior rearview mirror assembly of claim 13 including a housing, said bezel securing to said housing to at least partially encase said reflective element, said mounting plate, said accessory and said printed circuit board within said housing.

15. The interior rearview mirror assembly of claim 14, wherein said housing includes a recessed portion for at least partially receiving said pocket and said accessory when said bezel is secured to said housing.

16. The interior rearview mirror assembly of claim 15, wherein said accessory at least partially protrudes through said second portion, said accessory being generally flush with said second portion and said housing.

17. A method for assembling an interior rearview mirror assembly comprising:
 providing a bezel portion having a first portion of an accessory pocket;
 providing a reflective element having a mounting plate on a rear surface thereof, said mounting plate including a second portion of said accessory pocket;
 positioning an accessory at one of said first and second portions of said accessory pocket, wherein positioning an accessory comprises positioning a microphone module at one of said first and second portions of said accessory pocket, wherein said second portion comprises a platform extending from said mounting plate and said first portion of said pocket comprises an upper retainer extending from said bezel portion, and wherein positioning a microphone module comprises positioning a microphone module on said platform and retaining said microphone module on said platform by engaging an upper portion of said microphone module with said upper retainer as said reflective element is assembled to said bezel portion; and
 assembling said reflective element to said bezel portion, whereby said accessory is at least partially received and retained between said first and second portions as said reflective element is assembled to said bezel portion.

18. The method of claim 17 including providing an acoustic cover at least partially over at least one inlet port of said microphone module.

19. A method for assembling an interior rearview mirror assembly comprising:
 providing a bezel portion having a first portion of an accessory pocket;
 providing a reflective element having a mounting plate on a rear surface thereof, said mounting plate including a second portion of said accessory pocket;
 positioning an accessory at one of said first and second portions of said accessory pocket, wherein positioning an accessory comprises positioning a microphone module at one of said first and second portions of said accessory pocket;
 providing an acoustic cover at least partially over at least one inlet port of said microphone module, wherein said microphone module comprises a directional microphone having two inlet ports, said method including providing an acoustic barrier positioned across said microphone and between said inlet ports, said acoustic barrier being configured to substantially acoustically isolate one of said inlet ports from the other of said inlet ports; and
 assembling said reflective element to said bezel portion, whereby said accessory is at least partially received and retained between said first and second portions as said reflective element is assembled to said bezel portion.

20. The method of claim 19, wherein said second portion comprises a platform extending from said mounting plate and said first portion of said pocket comprises an upper retainer extending from said bezel portion.

21. The method of claim 19 including attaching a casing to said bezel portion.

* * * * *

UNITED STATES PATENT AND TRADEMARK OFFICE
CERTIFICATE OF CORRECTION

PATENT NO. : 7,657,052 B2  Page 1 of 1
APPLICATION NO. : 10/529715
DATED : February 2, 2010
INVENTOR(S) : Mark L. Larson et al.

It is certified that error appears in the above-identified patent and that said Letters Patent is hereby corrected as shown below:

Column 11:
Line 32, "Electroehromic" should be --Electrochromic--.

Column 12:
Line 20, "minor" should be --mirror--.

Column 22:
Line 60, "parts," should be --ports--.

Column 25:
Line 2, *"Chromogenies"* should be --*Chromogenics*--.
Line 24, "minor" should be --mirror--.
Line 35, "minor" should be --mirror--.

Column 27:
Line 32, Claim 2, "though" should be --through--.
Line 39, Claim 3, "though" should be --through--.

Column 28:
Line 4, Claim 6, "minor" should be --mirror--.
Line 26, Claim 7, "minor" should be --mirror--.

Signed and Sealed this

Fifteenth Day of June, 2010

David J. Kappos
*Director of the United States Patent and Trademark Office*